United States Patent
Takahashi et al.

(10) Patent No.: US 10,554,944 B2
(45) Date of Patent: Feb. 4, 2020

(54) PLAYING APPARATUS, PLAYING METHOD, INFORMATION PROCESSING APPARATUS, AND INFORMATION PROCESSING METHOD

(71) Applicant: SONY CORPORATION, Tokyo (JP)

(72) Inventors: Ryohei Takahashi, Kanagawa (JP); Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/538,100

(22) PCT Filed: Dec. 25, 2015

(86) PCT No.: PCT/JP2015/086201
§ 371 (c)(1),
(2) Date: Jun. 20, 2017

(87) PCT Pub. No.: WO2016/111198
PCT Pub. Date: Jul. 14, 2016

(65) Prior Publication Data
US 2017/0347081 A1    Nov. 30, 2017

(30) Foreign Application Priority Data

Jan. 9, 2015   (JP) .................................. 2015-002889

(51) Int. Cl.
*H04N 9/79* (2006.01)
*G11B 20/10* (2006.01)
(Continued)

(52) U.S. Cl.
CPC ..... *H04N 9/7925* (2013.01); *G11B 20/10527* (2013.01); *H04N 5/9201* (2013.01);
(Continued)

(58) Field of Classification Search
None
See application file for complete search history.

(56) References Cited

U.S. PATENT DOCUMENTS

2011/0164121 A1   7/2011  Ikeda et al.
2011/0187817 A1*  8/2011  Sasaki ................... G11B 27/00
                                                        348/42
(Continued)

FOREIGN PATENT DOCUMENTS

AU    2010299386 A1    7/2011
BR   112013031870 A2   12/2016
(Continued)

OTHER PUBLICATIONS

International Search Report and Written Opinion of PCT Application No. PCT/JP2015/086201, dated Mar. 29, 2016, 02 pages of English Translation and 08 pages of ISRWO.
(Continued)

*Primary Examiner* — Heather R Jones
(74) *Attorney, Agent, or Firm* — Chip Law Group

(57) ABSTRACT

The present technology relates to a playing apparatus, a playing method, an information processing apparatus, an information processing method, a program, and a recording medium that allow playing of appropriate HDR videos. A playing apparatus in an aspect of the present technology has a storage unit that has regions for storing a plurality of units of information indicating the state of the playing apparatus including preference information indicating the type of an HDR video to be preferentially played, out of a first HDR video that is essential in including in a content an HDR video as a video in a wider brightness range than a standard brightness range and a second HDR video that is capable of being included in the content. The playing apparatus acquires encoded data of the HDR video to be preferentially played indicated by the preference information, out of
(Continued)

encoded data of the first HDR video and encoded data of the second HDR video, and decodes the acquired encoded data. The present technology is applicable to Blu-ray disc players.

16 Claims, 34 Drawing Sheets

(51) Int. Cl.
*H04N 5/92* (2006.01)
*H04N 9/87* (2006.01)

(52) U.S. Cl.
CPC ..... *H04N 9/87* (2013.01); *G11B 2020/10537* (2013.01); *G11B 2220/2541* (2013.01)

(56) References Cited

U.S. PATENT DOCUMENTS

| | | |
|---|---|---|
| 2012/0177343 A1 | 7/2012 | Sasaki et al. |
| 2014/0125696 A1 | 5/2014 | Newton et al. |
| 2016/0100183 A1 | 4/2016 | Yamamoto et al. |
| 2017/0034497 A1 | 2/2017 | Yahata et al. |
| 2017/0347081 A1 | 11/2017 | Takahashi et al. |
| 2017/0366793 A1 | 12/2017 | Yahata et al. |
| 2017/0366794 A1 | 12/2017 | Yahata et al. |

FOREIGN PATENT DOCUMENTS

| | | |
|---|---|---|
| CA | 2749147 A1 | 3/2011 |
| CA | 2944869 A1 | 3/2016 |
| CN | 101685652 A | 3/2010 |
| CN | 102160389 A | 8/2011 |
| CN | 102362504 A | 2/2012 |
| CN | 103597812 A | 2/2014 |
| CN | 105284105 A | 1/2016 |
| CN | 105765657 A | 7/2016 |
| EP | 2343906 A1 | 7/2011 |
| EP | 2482563 A1 | 8/2012 |
| EP | 2721811 A1 | 4/2014 |
| EP | 3118854 A1 | 1/2017 |
| JP | 2009-058692 A | 3/2009 |
| JP | 2009-089209 A | 4/2009 |
| JP | 4724257 B2 | 7/2011 |
| JP | 2011-155657 A | 8/2011 |
| JP | 2011-160431 A | 8/2011 |
| JP | 2011-223605 A | 11/2011 |
| JP | 2011-250416 A | 12/2011 |
| JP | 4847631 B2 | 12/2011 |
| JP | 2014-528182 A | 10/2014 |
| JP | 2015-005878 A | 1/2015 |
| JP | 2015005787 A * | 1/2015 |
| JP | 2015-168344 A | 9/2015 |
| JP | 6053767 B2 | 12/2016 |
| JP | 2017-085587 A | 5/2017 |
| JP | 2017-152073 A | 8/2017 |
| JP | 2017-182872 A | 10/2017 |
| JP | 2017-182873 A | 10/2017 |
| JP | 2017-182874 A | 10/2017 |
| JP | 2017-182875 A | 10/2017 |
| JP | 2017-184263 A | 10/2017 |
| JP | 6230742 B2 | 11/2017 |
| JP | 6279694 B2 | 2/2018 |
| JP | 6285596 B2 | 2/2018 |
| JP | 6291114 B2 | 3/2018 |
| JP | 6291115 B2 | 3/2018 |
| KR | 10-2012-0036790 A | 4/2012 |
| KR | 10-2012-0106541 A | 9/2012 |
| MX | 2011002795 A | 4/2011 |
| MX | 2011009811 A | 9/2011 |
| MX | 340266 B | 7/2016 |
| RU | 2011110045 A | 7/2013 |
| RU | 2011139100 A | 10/2013 |
| RU | 2014100893 A | 7/2015 |
| TW | 201112233 A | 4/2011 |
| TW | 201134193 A | 10/2011 |
| TW | 201519225 A | 5/2015 |
| WO | 2010/143441 A1 | 12/2010 |
| WO | 2011/036888 A1 | 3/2011 |
| WO | 2012/172460 A1 | 12/2012 |
| WO | 2014/203747 A1 | 12/2014 |
| WO | 2016/038791 A1 | 3/2016 |
| WO | 2016/072051 A1 | 5/2016 |
| WO | 2016/111198 A1 | 7/2016 |

OTHER PUBLICATIONS

Extended European Search Report of EP Patent Application No. 15877071.9, dated Aug. 9, 2018, 07 pages.

Office Action for CN Patent Application No. 201580072095.0, dated May 8, 2019, 19 pages of Office Action and 11 pages of English Translation.

Office Action for JP Patent Application No. 2016-568333, dated May 28, 2019, 05 pages of Office Action and 05 pages of English Translation.

* cited by examiner

FIG. 2

| | |
|---|---|
| HDR-COMPATIBLE PLAYER | Mandatory HDR |
| | Mandatory/Option A HDR |
| | Mandatory/Option B HDR |
| | Mandatory/Option A/Option B HDR |
| HDR-COMPATIBLE DISPLAY | Mandatory HDR |
| | Mandatory/Option A HDR |
| | Mandatory/Option B HDR |
| | Mandatory/Option A/Option B HDR |
| HDR DISC | Mandatory HDR |
| | Mandatory/Option A HDR |
| | Mandatory/Option B HDR |
| | Mandatory/Option A/Option B HDR |

FIG. 3

| BD Player PLAYING Capability | Contents in BD | Display DISPLAYING Capability | PLAY/DISPLAY | COMMENTS |
|---|---|---|---|---|
| HDR player (Mandatory only) | Mandatory HDR | Mandatory HDR only | Mandatory HDR | |
| | | Mandatory/Option A HDR | Mandatory HDR | |
| | | Mandatory/Option B HDR | Mandatory HDR | |
| | Mandatory/ Option A HDR | Mandatory HDR only | Mandatory HDR | THE Player IS NOT Option A-COMPATIBLE BUT PLAYS Mandatory HDR REGARDLESS OF Display TYPE |
| | | Mandatory/Option A HDR | Mandatory HDR | DITTO |
| | | Mandatory/Option B HDR | Mandatory HDR | DITTO |
| | Mandatory/ Option B HDR | Mandatory HDR only | Mandatory HDR | THE Player IS NOT Option B-COMPATIBLE BUT PLAYS Mandatory HDR WITHOUT CONDITION |
| | | Mandatory/Option A HDR | Mandatory HDR | DITTO |
| | | Mandatory/Option B HDR | Mandatory HDR | DITTO |

FIG. 4

| BD Player PLAYING Capability | | Contents in BD | Display DISPLAYING Capability | PLAY/DISPLAY | COMMENTS |
|---|---|---|---|---|---|
| HDR player (Mandatory/Option A) | | Mandatory HDR | Mandatory HDR only | Mandatory HDR | |
| | | | Mandatory/Option A HDR | Mandatory HDR | |
| | | | Mandatory/Option B HDR | Mandatory HDR | |
| | | Mandatory/Option A HDR | Mandatory HDR only | Mandatory HDR | THE Display IS NOT Option A HDR-COMPATIBLE BUT THE PLAYER PLAYS Mandatory HDR |
| | | | Mandatory/Option A HDR | Mandatory/Option A HDR | THE PLAYER PLAYS Mandatory HDR OR Option A HDR ACCORDING TO PSR SETTINGS |
| | | | Mandatory/Option B HDR | Mandatory HDR | THE Display IS NOT Option A HDR-COMPATIBLE BUT THE PLAYER PLAYS Mandatory HDR |
| | | Mandatory/Option B HDR | Mandatory HDR only | Mandatory HDR | THE Player IS NOT Option B-COMPATIBLE BUT PLAYS Mandatory HDR REGARDLESS OF Display TYPE |
| | | | Mandatory/Option A HDR | Mandatory HDR | DITTO |
| | | | Mandatory/Option B HDR | Mandatory HDR | DITTO |

FIG. 5

| BD Player PLAYING Capability | Contents in BD | Display DISPLAYING Capability | PLAY/DISPLAY | COMMENTS |
|---|---|---|---|---|
| HDR player (Mandatory/Option B) | Mandatory HDR | Mandatory HDR only | Mandatory HDR | |
| | | Mandatory/Option A HDR | Mandatory HDR | |
| | | Mandatory/Option B HDR | Mandatory HDR | |
| | Mandatory/Option A HDR | Mandatory HDR only | Mandatory HDR | THE Player IS NOT Option A-COMPATIBLE BUT PLAYS Mandatory HDR REGARDLESS OF Display TYPE |
| | | Mandatory/Option A HDR | Mandatory HDR | DITTO |
| | | Mandatory/Option B HDR | Mandatory HDR | DITTO |
| | Mandatory/Option B HDR | Mandatory HDR only | Mandatory HDR | THE Display IS NOT Option B HDR-COMPATIBLE BUT THE PLAYER PLAYS Mandatory HDR |
| | | Mandatory/Option A HDR | Mandatory HDR | THE Display IS NOT Option B HDR-COMPATIBLE BUT THE PLAYER PLAYS Mandatory HDR |
| | | Mandatory/Option B HDR | Mandatory/Option B HDR | THE PLAYER PLAYS Mandatory HDR OR Option B HDR ACCORDING TO PSR SETTINGS |

FIG. 6

| BD Player PLAYING Capability | Contents in BD | Display DISPLAYING Capability | PLAY/DISPLAY |
|---|---|---|---|
| HDR player (Mandatory/ Option A/Option B) | Mandatory HDR | Mandatory HDR only | Mandatory HDR |
| | | Mandatory/Option A HDR | Mandatory HDR |
| | | Mandatory/Option B HDR | Mandatory HDR |
| | | Mandatory/Option A/Option B HDR | Mandatory HDR |
| | Mandatory/Option A HDR | Mandatory HDR only | Mandatory HDR |
| | | Mandatory/Option A HDR | Mandatory/Option A HDR |
| | | Mandatory/Option B HDR | Mandatory HDR |
| | | Mandatory/Option A/Option B HDR | Mandatory/Option A HDR |
| | Mandatory/Option B HDR | Mandatory HDR only | Mandatory HDR |
| | | Mandatory/Option A HDR | Mandatory HDR |
| | | Mandatory/Option B HDR | Mandatory/Option B HDR |
| | | Mandatory/Option A/Option B HDR | Mandatory/Option B HDR |
| | Mandatory/ Option A/Option B HDR | Mandatory HDR only | Mandatory HDR |
| | | Mandatory/Option A HDR | Mandatory/Option A HDR |
| | | Mandatory/Option B HDR | Mandatory/Option B HDR |
| | | Mandatory/Option A/Option B HDR | Mandatory/Option A/ Option B HDR |

FIG. 10

| Syntax | No. of bits | Mnemonic |
|---|---|---|
| index.bdmv { | | |
|   type_indicator | 8*4 | bslbf |
|   version_number | 8*4 | bslbf |
|   Indexes_start_address | 32 | uimsbf |
|   EetensionData_start_address | 32 | uimsbf |
|   reserved_for_future_use | 192 | bslbf |
|   AppInfoBDMV() | | |
|   for(i=0;i<N1;i++) { | | |
|     padding_word | 16 | bslbf |
|   } | | |
|   Indexes() | | |
|   for(i=0;i<N2;i++) { | | |
|     padding_word | 16 | bslbf |
|   } | | |
|   EetensionData | | |
|   for(i=0;i<N3;i++) { | | |
|     padding_word | 16 | bslbf |
|   } | | |
| } | | |

FIG. 11

| AppInfoBDMV() { | No. of bits | Mnemonic |
|---|---|---|
| length | 32 | uimsbf |
| reserved_for_future_use | 3 | bslbf |
| initial_output_mode_preference | 1 | bslbf |
| SS_content_exist_flag | 1 | bslbf |
| HDR_flag | 1 | bslbf |
| option_A_HDR_flag | 1 | bslbf |
| option_B_HDR_flag | 1 | bslbf |
| video_format | 4 | bslbf |
| frame_rate | 4 | bslbf |
| content_provider_user_data | 8*32 | bslbf |
| } | | |

FIG. 12

| | VALUE: MEANING |
|---|---|
| HDR_flag | 0b: Mandatory HDR IS NOT INCLUDED<br>1b: Mandatory HDR IS INCLUDED |
| option_A_HDR_flag | 0b: Option A HDR IS NOT INCLUDED<br>1b: Option A HDR IS INCLUDED |
| option_B_HDR_flag | 0b: Option B HDR IS NOT INCLUDED<br>1b: Option B HDR IS INCLUDED |

FIG. 17

| PSR number | Name | Meaning |
|---|---|---|
| 0 | Interactive Graphics | Interactive Graphics Stream Number |
| 1 | Primary Audio | Primary Audio Stream Number |
| 2 | PG TextST stream and PiP PG TextST stream | PG TextST Stream Number and PiP PG TextST Stream Number |
| 3 | Angle | Angle Number |
| 4 | Title | Title Number |
| 5 | Chapter | Chapter Number |
| 6 | PlayList | PlayList id |
| 7 | PlayItem | PlayItem id |
| 8 | Presentation Time | Presentation Time in 45kHz |
| 9 | Timer | Navigation Timer |
| 10 | Selected Button | Button id in Selected State |
| 11 | Menu Page | Page id |
| 12 | Selected Style | User Style Number |
| 13 | Parental | Parental Level |
| 14 | Secondary Audio and Secondary Video | Secondary Audio Stream Number and Secondary Video Stream Number |
| 15 | Audio Capability | Player Capability for Audio |
| 16 | Audio Language | Language Code for Audio |
| 17 | Presentation Graphics and Text subtitle Language | Language Code for Presentation Graphics and Text subtitle |
| 18 | Menu Language | Language Code for Menu Description |
| 19 | Country | Country Code |
| 20 | Region | Region Code |
| 21 | Output Mode Preference(Note3) | Output Mode Preference value |
| 22 | Stereoscopic status(Note3) | Stereoscopic status |
| 23 | Display Capability(Note3) | Display Capability for video |
| 24 | 3D Capability(Note3) | Player Capability for 3D |
| 25 | HDR Output Mode Preference | HDR Output Mode Preference value |
| 26 | HDR video Capability | HDR video Capability |
| 27 | HDR video Display Capability | HDR video Display Capability |
| 28 | – | reserved |
| 29 | Video Capability | Player Capability for Video |
| 30 | Text Capability | Player Capability for Text Subtitle |
| 31 | Player Profile/ Player Version | Profile/Version number |
| 32 TO 35 | – | reserved |

FIG. 19

| HDR Output Mode Preference | VALUE: MEANING |
|---|---|
| | 000b: PLAY Mandatory HDR<br>001b: PLAY Option A HDR<br>010b: PLAY Option B HDR<br>011b-111b: reserved for future use |

FIG. 21

| b31-b8 reserved | | | | | | | Option B HDR video display capability | Option A HDR video display capability | HDR video display capability |
|---|---|---|---|---|---|---|---|---|---|
| b7 reserved | b6 | b5 | b4 | b3 | | | b2 | b1 | b0 |

PLAYING APPARATUS, PLAYING METHOD, INFORMATION PROCESSING APPARATUS, AND INFORMATION PROCESSING METHOD

CROSS REFERENCE TO RELATED APPLICATIONS

This application is a U.S. National Phase of International Patent Application No. PCT/JP2015/086201 filed on Dec. 25, 2015, which claims priority benefit of Japanese Patent Application No. JP 2015-002889 filed in the Japan Patent Office on Jan. 9, 2015. Each of the above-referenced applications is hereby incorporated herein by reference in its entirety.

TECHNICAL FIELD

The present technology relates to a playing apparatus, a playing method, an information processing apparatus, an information processing method, a program, and a recording medium. More specifically, the present technology relates to a playing apparatus, a playing method, an information processing apparatus, an information processing method, a program, and a recording medium that allow playing of appropriate HDR videos.

BACKGROUND ART

There are Blu-ray (registered trademark) discs (hereinafter, called BDs as appropriate) as media for recording contents such as movies. Videos to be recorded on the BDs are authored with a compressed dynamic range of a master video on the basis of the assumption that the videos are viewed on a display with standard brightness (the maximum brightness is 100 nit (=100 cd/m2)).

The master video is shot by a high-quality camera and has a dynamic range in excess of a dynamic range that can be displayed on a display with standard brightness. Naturally, the compression results in loss of the dynamic range of the master video.

With advancements in display techniques such as organic electroluminescence (EL) displays and liquid crystal displays (LCDs), brighter displays than standard ones, with maximum brightness levels of 500 nit and 1000 nit, have been commercially available. There is currently demand for contents that capitalize on the performance of such displays.

Accordingly, in recent years, Blu-ray Disc Association (BDA) as an organization for formulating Blu-ray disc standards has been studying standards for enabling recording of high dynamic range (HDR) videos as videos with extended dynamic ranges.

CITATION LIST

Patent Document

Patent Document 1: Japanese Patent Application Laid-Open No. 2009-58692
Patent Document 2: Japanese Patent Application Laid-Open No. 2009-89209

SUMMARY OF THE INVENTION

Problems to be Solved by the Invention

When an BD possibly recording an HDR video is inserted into a BD player, the BD player needs to check whether the video recorded on the BD is an HDR video and whether the display as the output destination of the video supports the display of HDR videos, and play the video in an appropriate manner.

In light of the foregoing circumstances, the present technology is intended to play an appropriate HDR video.

Solutions to Problems

A playing apparatus according to one aspect of the present technology includes: a storage unit that has regions for storing a plurality of units of information indicating the state of the playing apparatus including preference information indicating the type of an HDR video to be preferentially played, out of a first HDR video that is essential in including in a content an HDR video as a video in a wider brightness range than a standard brightness range and a second HDR video that is capable of being included in the content; an acquisition unit that acquires encoded data of the HDR video to be preferentially played indicated by the preference information, out of encoded data of the first HDR video and encoded data of the second HDR video; and a decoding unit that decodes the encoded data acquired by the acquisition unit.

In one aspect of the present technology, reference is made to the preference information indicating which type of an HDR video to be preferentially played, the first HDR video that is essential in including in the content an HDR video as a video in a wider brightness range than the standard brightness range stored in the storage unit where the regions are formed to store the plurality of pieces of information indicative of the state of the playing apparatus and the second HDR video that is capable of being included in the content. In addition, out of the encoded data of the first HDR video and the encoded data of the second HDR video, the encoded data of the HDR video to be preferentially played indicated by the preference information is acquired, and the acquired encoded data is decoded.

Effects of the Invention

According to the present technology, it is possible to play an appropriate HDR video.

Incidentally, the advantages described here are not limited but any one of the advantages described in the present disclosure may be applied.

BRIEF DESCRIPTION OF DRAWINGS

FIG. 2 is a diagram illustrating the types of players, displays, and BDs.

FIG. 3 is a diagram illustrating the types of HDR videos that are to be played by a mandatory HDR-compatible player and to be displayed on displays.

FIG. 4 is a diagram illustrating the types of HDR videos that are to be played by a mandatory/option A HDR-compatible player and to be displayed on displays.

FIG. 5 is a diagram illustrating the types of HDR videos that are to be played by a mandatory/option B HDR-compatible player and to be displayed on displays.

FIG. 6 is a diagram illustrating the types of HDR videos that are to be played by a mandatory/option A/option B HDR-compatible player and to be displayed on displays.

FIG. 10 is a diagram illustrating a syntax of an index table.

FIG. 11 is a diagram illustrating a syntax of AppInfoB-DMV( ) illustrated in FIG. 10.

FIG. 12 is a diagram illustrating the meanings of respective values of information.

FIG. 17 is a diagram illustrating an example of assignment of PSRs.

FIG. 19 is a diagram illustrating the meanings of values of HDR output mode preference.

FIG. 21 is a diagram illustrating of an example of a PSR 27.

MODE FOR CARRYING OUT THE INVENTION

A mode for carrying out the present technology will be described below. The descriptions will be given in the following order:

1. About a recording/playing system
2. About a BD format
3. About configurations of apparatuses
4. About operations of apparatuses
5. Modification examples <<1. About a Recording/Play System>>

Figure 1:
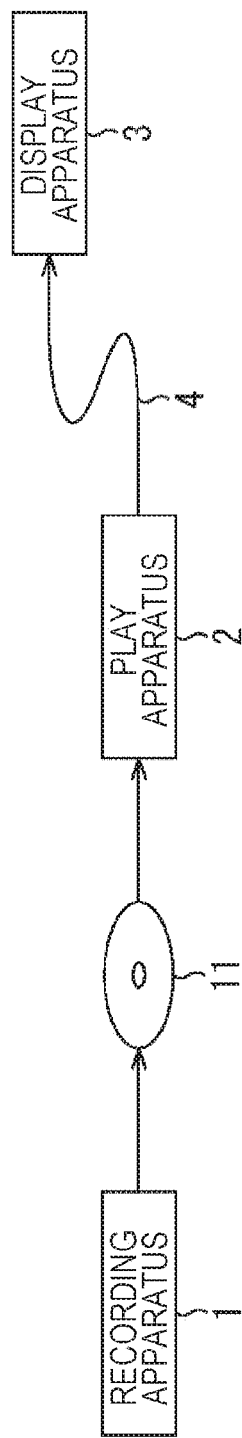
FIG. 1 is a diagram illustrating a configuration example of a recording/playing system according to an embodiment of the present technology.

FIG. 1 is a diagram illustrating a configuration example of a recording/playing system according to an embodiment of the present technology.

The recording/playing system illustrated in FIG. 1 includes a recording apparatus 1, a playing apparatus 2, and a display apparatus 3. The playing apparatus 2 and the display apparatus 3 are connected via a cable 4 under predetermined standards such as High Definition Multimedia Interface standards (HDMI) (registered trademark) standards. Alternatively, the playing apparatus 2 and the display apparatus 3 may be connected via wireless communication.

The recording apparatus 1 records a content on a disc 11, and the playing apparatus 2 plays the content recorded on the disc 11. The content is provided from the recording apparatus 1 to the playing apparatus 2 by the use of the disc 11. The disc 11 is an optical disc on which the content is recorded in Blu-ray (registered trademark) disc read-only (BD-ROM) format, for example.

The content may be recorded on the disc 11 in another BD format such as BD-R or -RE. In addition, the content may be provided from the recording apparatus 1 to the playing apparatus 2 by the use of a removable medium other than an optical disc such as a memory card including a flash memory.

When the disc 11 is a BD-ROM disc, the recording apparatus 1 is an apparatus used by the author of the content. In this example, the disc on which the content is recorded by the recording apparatus 1 is provided to the playing apparatus 2. In actuality, however, a disc copied from a master disc on which the content is recorded by the recording apparatus 1 is provided to the playing apparatus 2.

The recording apparatus 1 creates a content including a Standard Dynamic Range (SDR) video as a video in a dynamic range (brightness range) capable of being displayed on a display of standard brightness. The maximum brightness of the standard-brightness display is 100 cd/m2 (=100 nit), for example. The recording apparatus 1 also creates as appropriate a content including a High Dynamic Range (HDR) video as a video of a wider dynamic range than that of an SDR video.

For example, an SDR video is created by compressing the dynamic range of the master video. An HDR video is created by adjusting the dynamic range of the master video to have a wider dynamic range than that of the SDR video. The maximum brightness of the HDR video is as higher than the standard brightness as 1000 nit, for example.

In the BD format to which the present technology is applied, one mandatory HDR technique and a plurality of option HDR techniques are employed as HDR techniques for creating HDR videos.

The mandatory HDR technique is an HDR technique that is essential in the case of employing HDR techniques in the BD format. Meanwhile, the option HDR techniques are not essential but can be selectively employed. These HDR techniques vary in signal processing for creating the HDR videos.

Descriptions will be given below as to the case of using the mandatory HDR technique and two option HDR techniques, that is, an option A HDR technique and an option B HDR technique. The HDR video created using the mandatory HDR technique is a mandatory HDR video.

In addition, the HDR video created using the option A HDR technique is an option A HDR video, and the HDR video created using the option B HDR technique is an option B HDR video. When the option A HDR video and the option B HDR video do not need to be differentiated, these videos will be hereinafter called collectively option HDR videos as appropriate.

The mandatory HDR video can be played only by a player with the capability of playing the mandatory HDR video, and can be displayed only on a display with the capability of displaying the mandatory HDR video.

Similarly, the option A HDR video can be played only by a player with the capability of playing the option A HDR video, and can be displayed only on a display with the capability of displaying the option A HDR video. The option B HDR video can be played only by a player with the capability of playing the option B HDR video, and can be displayed only on a display having the capability of displaying the option B HDR video.

At the time of playing the disc 11 recording an HDR video, the playing apparatus 2 recognizes the type of the recorded HDR video, the type of the HDR video capable of being played by the playing apparatus 2, the type of the HDR video capable of being displayed on the display of the display apparatus 3, and the like, and performs appropriate processing.

FIG. 2 is a diagram illustrating the types of players, displays, and BDs.

The HDR-compatible players are players with the capability of playing HDR videos. The HDR-compatible players include a mandatory HDR-compatible player, a mandatory/option A HDR-compatible player, a mandatory/option B HDR-compatible player, and a mandatory/option A/option B HDR-compatible player.

The mandatory HDR-compatible player is a player compatible only with playing of the mandatory HDR video. The mandatory/option A HDR-compatible player is a player compatible with playing of the mandatory HDR video and playing of the option A HDR video. The mandatory/option B HDR-compatible player is a player compatible with playing of the mandatory HDR video and playing of the option B HDR video. The mandatory/option A/option B HDR-compatible player is a player compatible with playing of HDR videos of all the types.

Incidentally, even Non-HDR-compatible players without the capability of displaying HDR videos have the capability of playing the SDR videos.

The HDR-compatible displays are displays with the capability of displaying HDR videos. The HDR-compatible displays include a mandatory HDR-compatible display, a mandatory/option A HDR-compatible display, a mandatory/option B HDR-compatible display, and a mandatory/option A/option B HDR-compatible display.

The mandatory HDR-compatible display is a display compatible only with display of the mandatory HDR video. The mandatory/option A HDR-compatible display is a display compatible with display of the mandatory HDR video and display of the option A HDR video. The mandatory/option B HDR-compatible display is a display compatible with display of the mandatory HDR video and display of the option B HDR video. The mandatory/option A/option B HDR-compatible display is a display compatible with display of HDR videos of all the types.

Incidentally, the display performance of displays are not defined in the BD format. There are possibly displays that are not compatible with display of the mandatory HDR video but are compatible only with display of the option HDR videos.

The HDR discs are BDs recording HDR videos. The HDR discs include a mandatory HDR disc, a mandatory/option A HDR disc, a mandatory/option B HDR disc, and a mandatory/option A/option B HDR disc.

The mandatory HDR disc is a disc recording only the mandatory HDR video. The mandatory/option A HDR disc is a disc recording the mandatory HDR video and the option A HDR video. The mandatory/option B HDR disc is a disc recording the mandatory HDR video and the option B HDR video. The mandatory/option A/option B HDR disc is a disc recording HDR videos of all the types.

The HDR discs may record an SDR video as well as the HDR videos.

FIG. 3 is a diagram illustrating the types of HDR videos that are to be played by a mandatory HDR-compatible player and to be displayed on displays.

FIG. 3 does not describe the case where the disc is a mandatory/option A/option B HDR disc or the case where the display is a mandatory/option A/option B HDR-compatible display. A similar thing can be said to the descriptions in FIGS. 4 and 5.

When the inserted BD is a mandatory HDR disc, the mandatory HDR-compatible player plays the mandatory HDR video regardless of the type of the display as the output destination of the HDR video. The display displays the mandatory HDR video on the basis of the data output from the mandatory HDR-compatible player.

When the inserted BD is a mandatory/option A HDR disc, the mandatory HDR-compatible player plays the mandatory HDR video regardless of the type of the display as the output destination of the HDR video. This is because the player is not compatible with the playing of the option A HDR video recorded on the BD. The display displays the mandatory HDR video on the basis of the data output from the mandatory HDR-compatible player.

When the inserted BD is a mandatory/option B HDR disc, the mandatory HDR-compatible player plays the mandatory HDR video regardless of the type of the display as the output destination of the HDR video. This is because the player is not compatible with the playing of the option B HDR video recorded on the BD. The display displays the mandatory HDR video on the basis of the data output from the mandatory HDR-compatible player.

FIG. 4 is a diagram illustrating the types of HDR videos that are to be played by a mandatory/option A HDR-compatible player and to be displayed on displays.

When the inserted BD is a mandatory HDR disc, the mandatory/option A HDR-compatible player plays the mandatory HDR video regardless of the type of the display as the output destination of the HDR video. The display displays the mandatory HDR video on the basis of the data output from the mandatory/option A HDR-compatible player.

When the inserted BD is a mandatory/option A HDR disc and the display as the output destination of the HDR video is a mandatory HDR-compatible display or a mandatory/option B HDR-compatible display, the mandatory/option A HDR-compatible player plays the mandatory HDR video. This is because the display is not compatible with the display of the option A HDR video recorded on the BD. The display displays the mandatory HDR video on the basis of the data output from the mandatory/option A HDR-compatible player.

When the inserted BD is a mandatory/option A HDR disc and the display as the output destination of the HDR video is a mandatory/option A HDR-compatible display, the mandatory/option A HDR-compatible player plays the mandatory HDR video or the option A HDR video. Which of the HDR videos to be played is determined according to the settings in player status registers (PSRs). As described later, the PSRs are registers that store various kinds of information indicative of the capabilities of the playing apparatus 2 as a BD player and the current settings of the playing apparatus 2. The display displays the mandatory HDR video or the option A HDR video on the basis of the data output from the mandatory/option A HDR-compatible player.

When the inserted BD is a mandatory/option B HDR disc, the mandatory/option A HDR-compatible player plays the mandatory HDR video regardless of the type of the display as the output destination of the HDR video. This is because the player is not compatible with the playing of the option B HDR video recorded on the BD. The display displays the mandatory HDR video on the basis of the data output from the mandatory/option A HDR-compatible player.

FIG. 5 is a diagram illustrating the types of HDR videos that are to be played by a mandatory/option B HDR-compatible player and to be displayed on displays.

When the inserted BD is a mandatory HDR disc, the mandatory/option B HDR-compatible player plays the mandatory HDR video regardless of the type of the display as the output destination of the HDR video. The display displays the mandatory HDR video on the basis of the data output from the mandatory/option B HDR-compatible player.

When the inserted BD is a mandatory/option A HDR disc, the mandatory/option B HDR-compatible player plays the mandatory HDR video regardless of the type of the display as the output destination of the HDR video. This is because the player is not compatible with the playing of the option A HDR video recorded on the BD. The display displays the mandatory HDR video on the basis of the data output from the mandatory/option B HDR-compatible player.

When the inserted BD is a mandatory/option B HDR disc and the display as the output destination of the HDR video is a mandatory HDR-compatible display or a mandatory/option A HDR-compatible display, the mandatory/option B HDR-compatible player plays the mandatory HDR video. This is because the display is not compatible with the display of the option B HDR video recorded on the BD. The display displays the mandatory HDR video on the basis of the data output from the mandatory/option B HDR-compatible player.

When the inserted BD is a mandatory/option B HDR disc and the display as the output destination of the HDR video is a mandatory/option B HDR-compatible display, the mandatory/option B HDR-compatible player plays the mandatory HDR video or the option B HDR video. Which of the HDR videos is to be played is determined according to the settings in the PSRs. The display displays the mandatory HDR video or the option B HDR video on the basis of the data output from the mandatory/option B HDR-compatible player.

FIG. 6 is a diagram illustrating the types of HDR videos that are to be played by a mandatory/option A/option B HDR-compatible player and to be displayed on displays.

When the inserted BD is a mandatory HDR disc, the mandatory/option A/option B HDR-compatible player plays the mandatory HDR video regardless of the type of the display as the output destination of the HDR video. The display displays the mandatory HDR video on the basis of the data output from the mandatory/option A/option B HDR-compatible player.

When the inserted BD is a mandatory/option A HDR disc and the display as the output destination of the HDR video is a mandatory HDR-compatible display or a mandatory/option B HDR-compatible display, the mandatory/option A/option B HDR-compatible player plays the mandatory HDR video. This is because the display is not compatible with the display of the option A HDR video recorded on the BD. The display displays the mandatory HDR video on the basis of the data output from the mandatory/option A/option B HDR-compatible player.

When the inserted BD is a mandatory/option A HDR disc and the display as the output destination of the HDR video is a mandatory/option A HDR-compatible display or a mandatory/option A/option B HDR-compatible display, the mandatory/option A/option B HDR-compatible player plays the mandatory HDR video or the option A HDR video. Which of the HDR videos is to be played is determined according to the settings in the PSRs. The display displays the mandatory HDR video or the option A HDR video on the basis of the data output from the mandatory/option A/option B HDR-compatible player.

When the inserted BD is a mandatory/option B HDR disc and the display as the output destination of the HDR video is a mandatory HDR-compatible display or a mandatory/option A HDR-compatible display, the mandatory/option A/option B HDR-compatible player plays the mandatory HDR video. This is because the display is not compatible with the display of the option B HDR video on the BD. The display displays the mandatory HDR video on the basis of the data output from the mandatory/option A/option B HDR-compatible player.

When the inserted BD is a mandatory/option B HDR disc and the display as the output destination of the HDR video is a mandatory/option B HDR-compatible display or a mandatory/option A/option B HDR-compatible display, the mandatory/option A/option B HDR-compatible player plays the mandatory HDR video or the option B HDR video. Which of the HDR videos is to be played is determined according to the settings in the PSRs. The display displays the mandatory HDR video or the option B HDR video on the basis of the data output from the mandatory/option A/option B HDR-compatible player.

When the inserted BD is a mandatory/option A/option B HDR disc and the display as the output destination of the HDR video is a mandatory HDR-compatible display, the mandatory/option A/option B HDR-compatible player plays the mandatory HDR video. The display displays the mandatory HDR video on the basis of the data output from the mandatory/option A/option B HDR-compatible player.

When the inserted BD is a mandatory/option A/option B HDR disc and the display as the output destination of the HDR video is a mandatory/option A HDR-compatible display, the mandatory/option A/option B HDR-compatible player plays the mandatory HDR video or the option A HDR video. Which of the HDR videos is to be played is determined according to the settings in the PSRs. The display displays the mandatory HDR video or the option A HDR video on the basis of the data output from the mandatory/option A/option B HDR-compatible player.

When the inserted BD is a mandatory/option A/option B HDR disc and the display as the output destination of the HDR video is a mandatory/option B HDR-compatible display, the mandatory/option A/option B HDR-compatible player plays the mandatory HDR video or the option B HDR video. Which of the HDR videos is to be played is determined according to the settings in the PSRs. The display displays the mandatory HDR video or the option B HDR video on the basis of the data output from the mandatory/option A/option B HDR-compatible player.

When the inserted BD is a mandatory/option A/option B HDR disc and the display as the output destination of the HDR video is a mandatory/option A/option B HDR-compatible display, the mandatory/option A/option B HDR-compatible player plays any one type of the HDR video. Which of the HDR videos is to be played is determined according to the settings in the PSRs. The display displays the mandatory HDR video, the option A HDR video, or the option B HDR video on the basis of the data output from the mandatory/option A/option B HDR-compatible player.

As described above, in the playing apparatus 2 as a BD player, out of the HDR videos recorded on the disc 11, the HDR videos of the types capable of being played by the playing apparatus 2 and displayed on the display as the output destination are determined as targets to be played.

Accordingly, the playing apparatus 2 can play appropriate one of the mandatory HDR video, the option A HDR video, and the option B HDR video. The user can view realistic pictures with a wide dynamic range.

The operation of switching the HDR videos as targets to be played by the playing apparatus 2 will be described later.

<<2. About a BD Format>>

A BD-ROM format will be described here.

<Data Management Structure>

Figure 7:
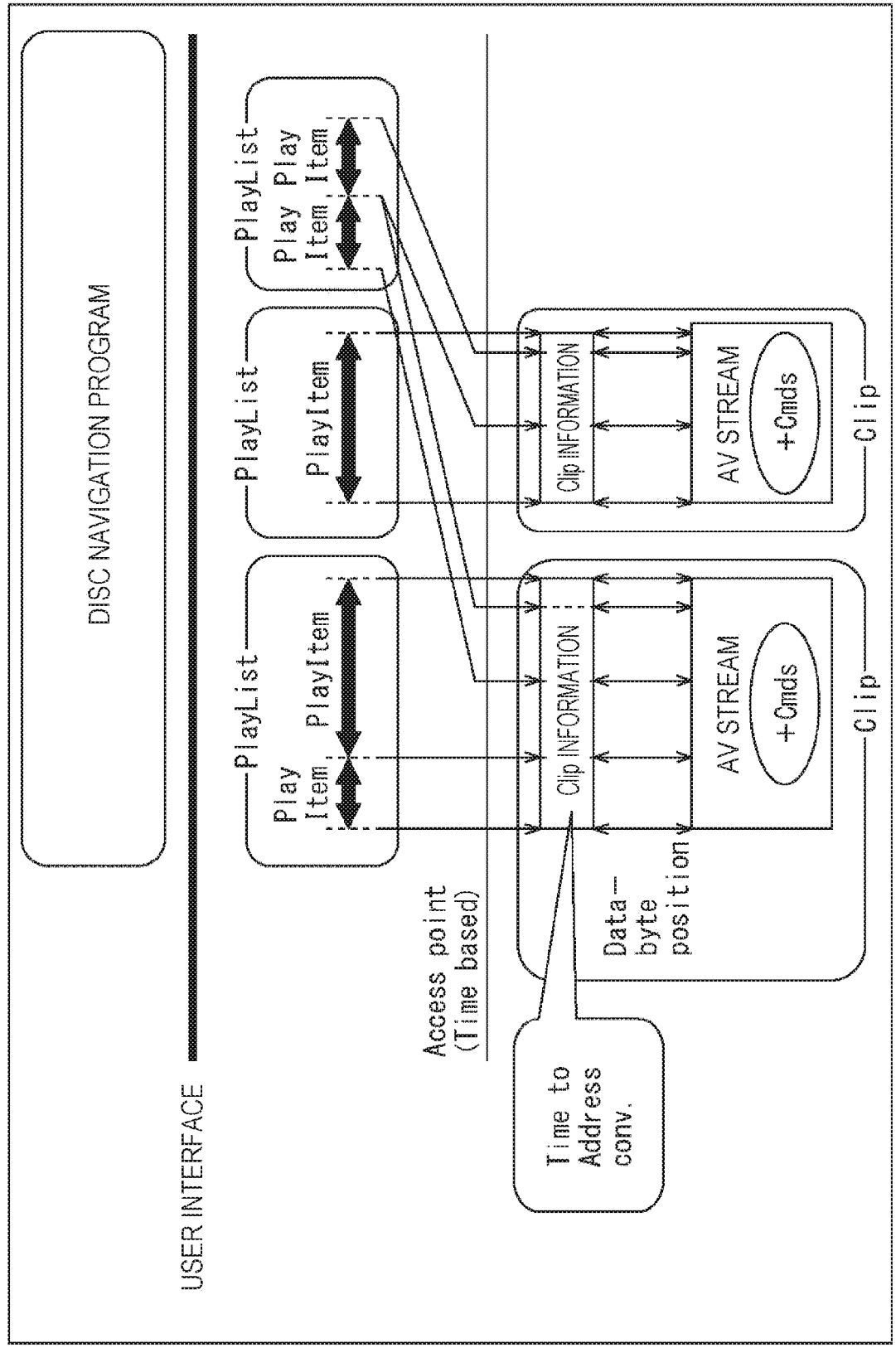
FIG. 7 is a diagram illustrating an example of a management structure for AV streams in a BD-ROM format.

FIG. 7 is a diagram illustrating an example of a management structure for AV streams in the BD-ROM format.

AV streams are managed in two layers of play list and clip. The AV streams may be recorded in a local storage of the playing apparatus 2 as well as the disc 11.

A pair of an AV stream and clip information accompanying the AV stream is managed as one object. The pair of an AV stream and clip information is called clip.

The AV streams are developed in a time-based manner, and access points to the clips are mainly specified by time stamps in play lists. The clip information is used to find the address in the AV stream where the decoding is to be started.

The play list is a collection of play sections in the AV stream. One play section in the AV stream is called as play item. The play item is represented by a pair of IN point and Out point in the time-based play section. As illustrated in FIG. 7, the play list includes one or more play items.

The first play list from the left side of FIG. 7 includes two play items. By the two play items, the first and second half portions of the AV stream included in the left clip are referred to.

The second play list from the left side includes one play item by which the entire AV stream included in the right clip is referred to.

The third play list from the left side includes two play items. By the two play items, the portion with the AV stream included in the left clip and the portion with the AV stream included in the right clip are referred to.

For example, when the left play item included in the first play list from the left side is specified as a target to be played by a disc navigation program, the first half portion of the AV stream included in the left clip and referred to by the play item is played.

In the play list, a play path formed by alignment of one or more play items is called as main path. Additionally, in the play list, a play path formed by the alignment of one or more sub play items in parallel to the main path is called sub path.

Figure 8:
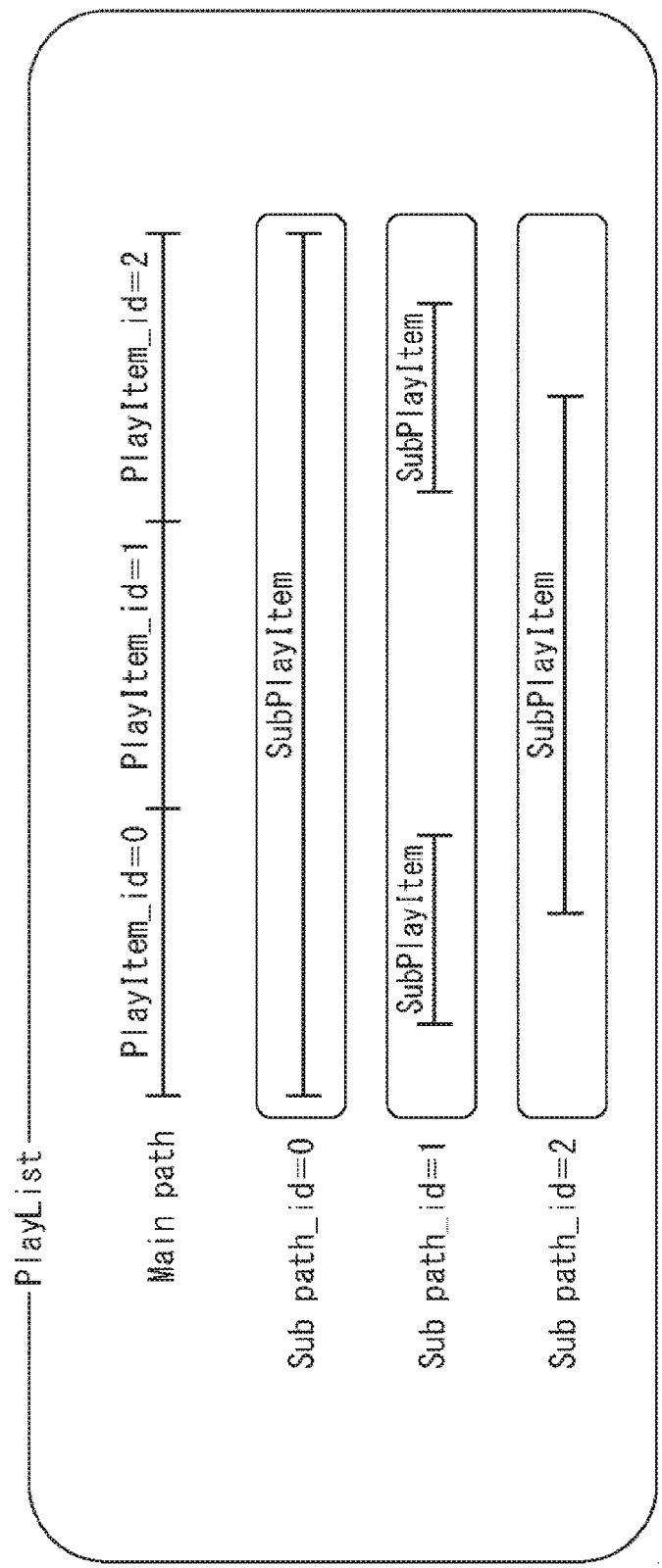
FIG. 8 is a diagram illustrating structures of a main path and sub paths.

FIG. 8 is a diagram illustrating structures of a main path and sub paths.

The play list has one main path and one or more sub paths. The play list illustrated in FIG. 8 has one main path and three sub paths formed by the alignment of three play items.

The play items constituting the main path have respective IDs set from the beginning in sequence. The sub paths also have IDs, that is, Subpath_id=0, Subpath_id=1, and Subpath_id=2 set from the beginning in sequence.

In the example of FIG. 8, the sub path with Subpath_id=0 includes one sub play item, the sub path with Subpath_id=1 includes two sub play items. Additionally, the sub path with Subpath_id=2 includes one sub play item.

The AV stream referred to by one play item includes at least a video stream (main image data). The AV stream may or may not include one or more audio streams to be played at the same time as (in synchronization with) the video stream included in the AV stream.

The AV stream may or may not include one or more bitmap subtitle data (presentation graphic (PG)) streams to be played in synchronization with the video stream included in the AV stream.

The AV stream may or may not include one or more interactive graphic (IG) streams to be played in synchronization with the video stream included in the AV stream file. The IG stream is used to display graphics of buttons and others to be operated by the user.

In the AV stream referred to by one play item, a video stream, and an audio stream, a PG stream, and an IG stream to be played in synchronization with the video stream are multiplexed.

Additionally, one sub play item refers to a video stream, an audio stream, a PG stream, and the like different from the AV stream referred to by the play item.

In this manner, the AV stream is played using the play list and the clip information as described above. In addition, the AV stream is played also using information such as an index table described later. The index table, the play list, and the clip information as play management information for use in the control of playing of the AV stream as a content will be called as database information as appropriate.

<Directory Structure>

Figure 9:
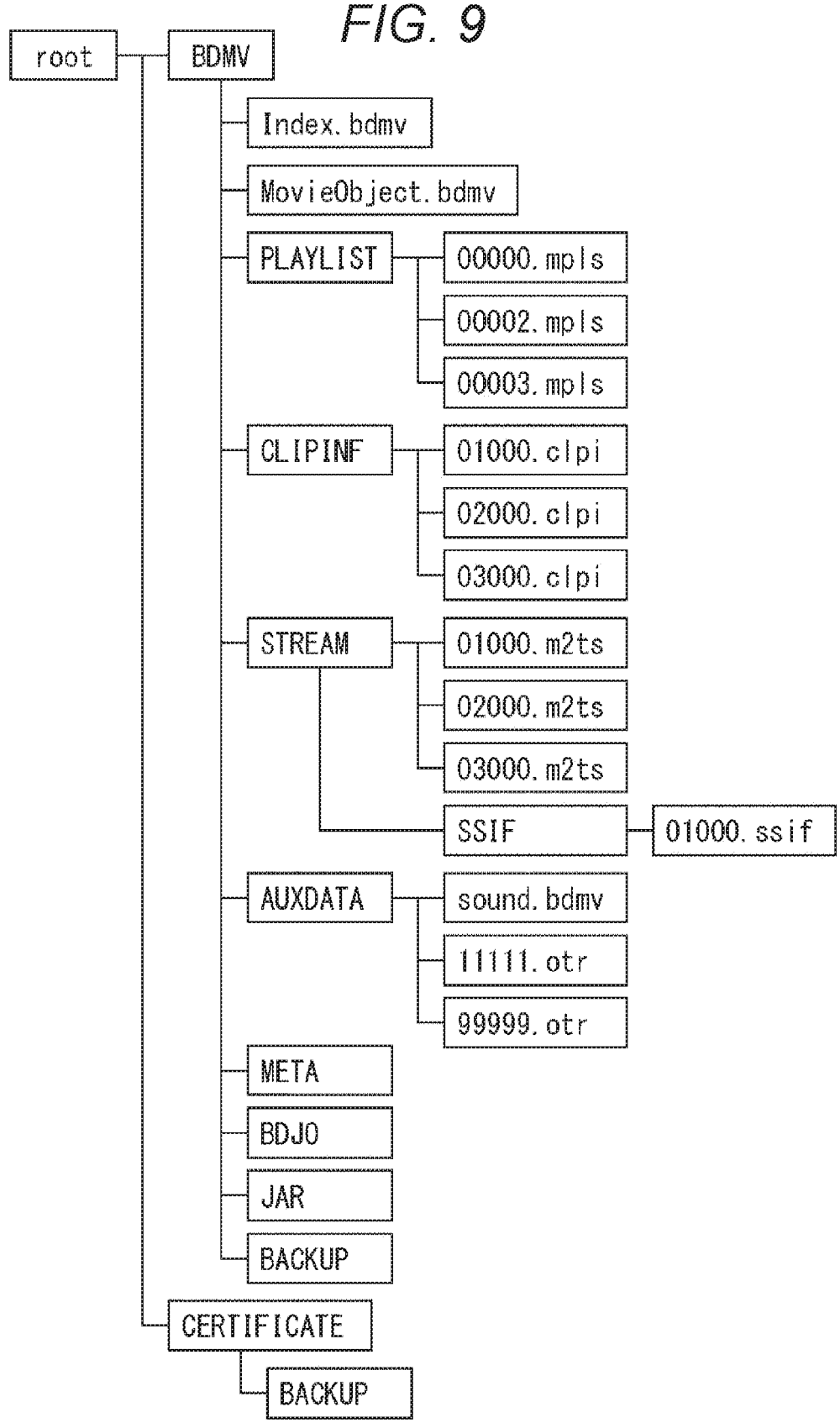
FIG. 9 is a diagram illustrating an example of a management structure of files recorded on a disc.

FIG. 9 is a diagram illustrating an example of a management structure of files recorded on the disc 11.

The files recorded on the disc 11 are managed hierarchically by a directory structure. One root directory is created on the disc 11.

A BDMV directory is placed under the root directory.

The BDMV directory holds an index table file assigned with the name "Index.bdmv" and a MovieObject file with the name "MovieObject.bdmv." The index table file describes the index table.

The BDMV directory holds a PLAYLIST directory, a CLIPINF directory, an STREAM directory, and the like.

The PLAYLIST directory holds play list files describing play lists. Each of the play list files is assigned with a name with a combination of a five-digit number and the extension ".mpls." The three play list files illustrated in FIG. 9 are assigned with the file names "00000.mpls," "00001.mpls," and "00002.mpls," respectively.

The CLIPINF directory holds clip information files. Each of the clip information files is assigned with a name with a combination of a five-digit number and the extension ".clpi." The three clip information files illustrated in FIG. 9 are assigned with the file names "01000.clpi," "02000.clpi," and "03000.clpi," respectively.

The STREAM directory holds AV stream files. Each of the AV stream files is assigned with a name with a combination of a five-digit number and the extension ".m2ts." The three AV stream files illustrated in FIG. 9 are assigned with the file names "01000.m2ts," "02000.m2ts," and "03000.m2ts," respectively.

The clip information file and the AV stream file assigned with the file names of the same five-digit number constitute one clip. At the time of playing the AV stream file "01000.m2ts," the clip information file "01000.clpi" is used. At the time of playing the AV stream file "02000.m2ts," the clip information file "02000.clpi" is used.

There is also provided a BDJO directory under the BDMV directory. The BDJO directory holds a BD-J object file A. The BD-J object file is a file of an application described in Java (registered trademark). The BD-J object file is read and executed by the playing apparatus 2.

<Example with the Use of the Index Table>

The syntax of an index table describing information for use in playing an HDR video will be explained here. The index table includes information on a list of contents stored in the BD. The index table is first read at the time of playing the disc.

FIG. 10 is a diagram illustrating a syntax of an index table.

AppInfoBDMV( ) holds various parameters including a parameter for the play mode immediately after the playing.

Indexes( ) holds information for specifying an object to be automatically played after the start of reading the BD.

ExtensionData( ) holds various types of extension information.

FIG. 11 is a diagram illustrating a syntax of AppInfoB-DMV( ) described in FIG. 10.

AppInfoBDMV( ) holds information for use in playing the HDR video including HDR_flag, option_A_HDR_flag, and option_B_HDR_flag.

FIG. 12 is a diagram illustrating the meanings of respective values of information.

The information HDR_flag is a one-bit flag indicating whether the BD (identical to the disc recording the index table describing HDR_flag) includes the mandatory HDR video.

When the value of HDR_flag is 0b, the mandatory HDR video is not included in the BD, and when the value of HDR_flag is 1b, the mandatory HDR video is included in the BD.

The information option_A_HDR_flag is a one-bit flag indicating whether the BD (identical to the disc recording the index table describing option_A_HDR_flag) includes the option A HDR video.

When the value of option_A_HDR_flag is 0b, the option A HDR video is not included in the BD, and when the value of option_A_HDR_flag is 1b, the option A HDR video is included is included in the BD.

The information option_B_HDR_flag is a one-bit flag indicating whether the BD (identical to the disc recording the index table describing option_B_HDR_flag) includes the option B HDR video.

When the value of option_B_HDR_flag is 0b, the option B HDR video is not included in the BD, when the value of option_B_HDR_flag is 1b, the option B HDR video is included in the BD.

Using HDR_flag, option_A_HDR_flag, and option_B_HDR_flag allows the author of the content to specify which type of HDR video is recorded on the BD.

In this manner, it is possible to describe the information for use in playing the HDR video collectively in AppInfoB-DMV( ) of the index table.

As described above, the index table is information described in the file first recorded at the time of playing the disc. Describing the information for use in playing the HDR video in the index table allows the playing apparatus 2 to perform the internal processing and switch the settings on communication with the display apparatus 3 immediately after the insertion of the disc.

At least one of HDR_flag, option_A_HDR_flag, and option_B_HDR_flag may be described in another region of the index table such as ExtensionData( ) instead of AppInfoBDMV( ). In addition, HDR_flag, option_A_HDR_flag, and option_B_HDR_flag may be added to another play management information such as the play list.

<<3. About Configurations of the Apparatuses>>

The configurations of the apparatuses will be explained here.

<Configuration of the Recording Apparatus 1>

Figure 13:
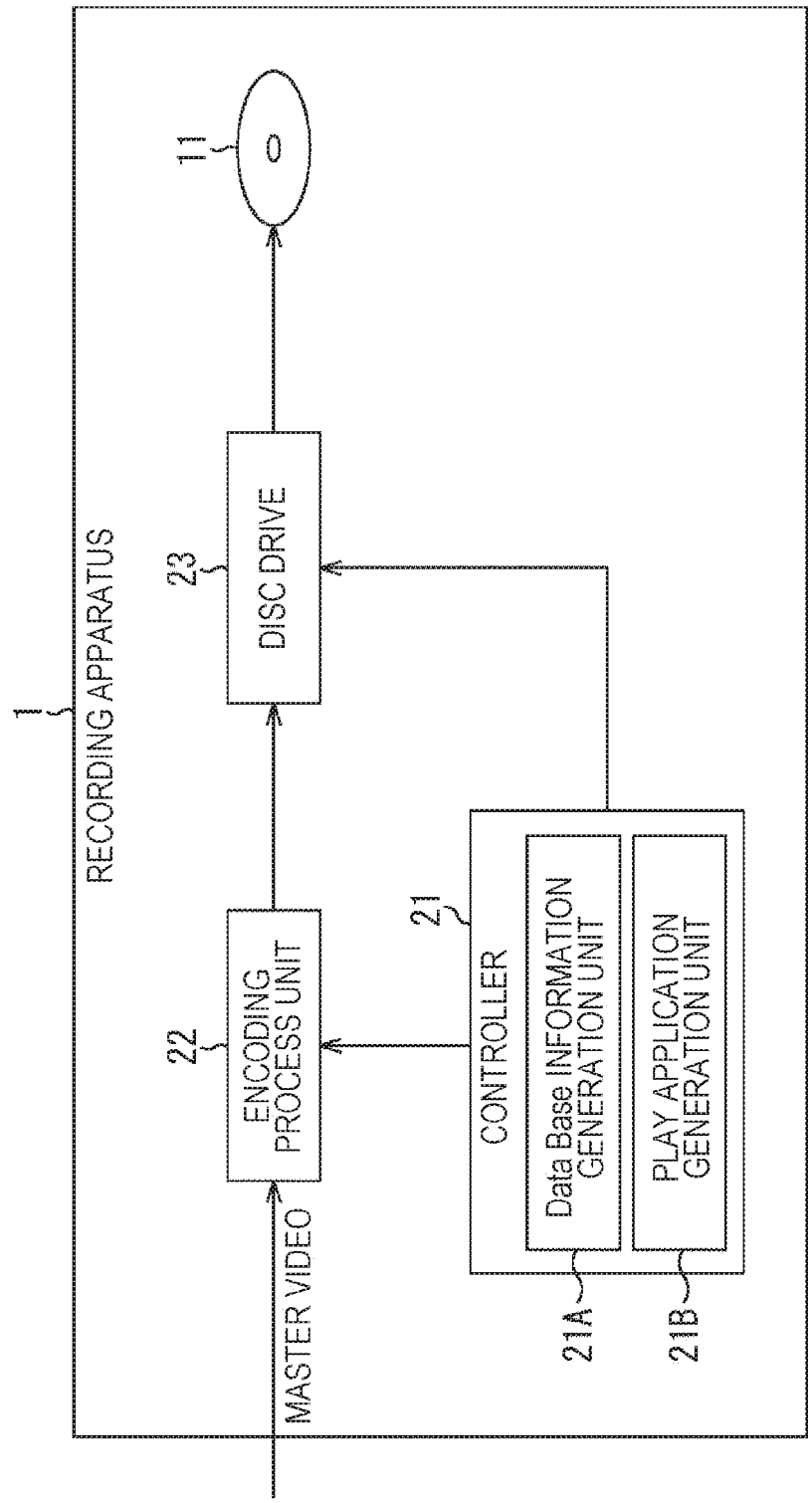
FIG. 13 is a block diagram illustrating a configuration example of a recording apparatus.

FIG. 13 is a block diagram illustrating a configuration example of the recording apparatus 1.

The recording apparatus 1 includes a controller 21, an encoding process unit 22, and a disc drive 23. The master video is input into the encoding process unit 22.

The controller 21 includes a central processing unit (CPU), a read only memory (ROM), a random access memory (RAM), and the like. The controller 21 executes a predetermined program to control the entire operation of the recording apparatus 1.

The controller 21 executes the predetermined program to implement a database information generation unit 21A and a play application generation unit 21B.

The database information generation unit 21A generates database information such as the index tables, the play lists, and the clip information, and outputs the same to the disc drive 23.

The play application generation unit 21B generates various BD-J applications, and outputs BD-J object files to the disc drive 23. For example, the play application generation unit 21B generates a play application for controlling display of a menu screen for use in selection of the play list as a target to be played and playing of the HDR video.

The encoding process unit 22 generates streams of various HDR videos and SDR videos on the basis of the master video, and multiplexes the same to generate an AV stream constituting the clip. The AV stream also includes an audio stream to be played in synchronization with the video. The encoding process unit 22 outputs the generated AV stream to the disc drive 23.

The disc drive 23 records the files of the database information and the play application supplied from the controller 21 and the file of the AV stream supplied from the encoding process unit 22 onto the disc 11 according to the directory structure illustrated in FIG. 9.

Figure 14:
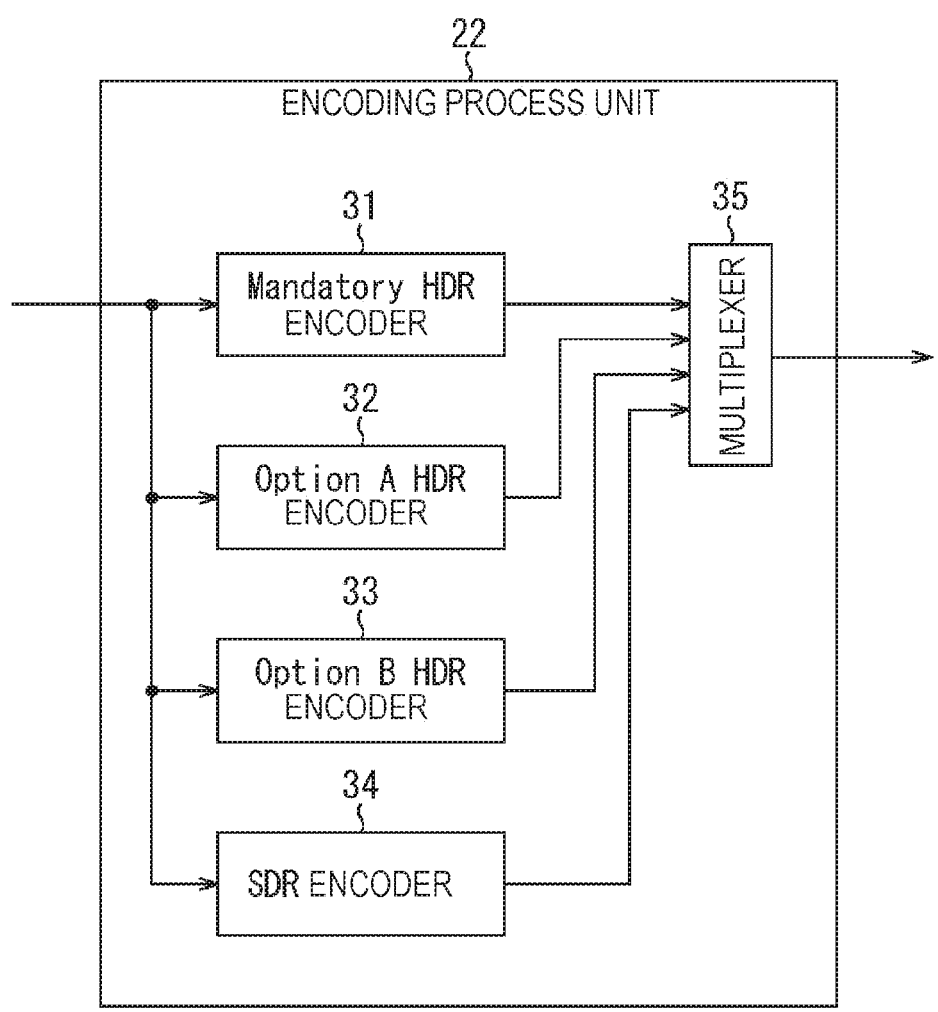
FIG. 14 is a block diagram illustrating a configuration example of an encoding process unit illustrated in FIG. 13.

FIG. 14 is a block diagram illustrating a configuration example of the encoding process unit 22 illustrated in FIG. 13.

The encoding process unit 22 includes a mandatory HDR encoder 31, an option A HDR encoder 32, an option B HDR encoder 33, an SDR encoder 34, and a multiplexer 35. The master video input into the recording apparatus 1 is supplied to the mandatory HDR encoder 31, the option A HDR encoder 32, the option B HDR encoder 33, SDR encoder 34.

The mandatory HDR encoder 31 performs signal processing on the master video using the BD format mandatory HDR technique to generate a mandatory HDR video. The mandatory HDR encoder 31 encodes the mandatory HDR video in a predetermined encoding system such as High Efficiency Video Coding (HEVC), and outputs the mandatory HDR video stream obtained by the encoding to the multiplexer 35.

The option A HDR encoder 32 performs signal processing on the master video using the BD format option A HDR technique to generate an option A HDR video. The option A HDR encoder 32 encodes the option A HDR video in a predetermined encoding system, and outputs the option A HDR video stream obtained by the encoding to the multiplexer 35.

The option B HDR encoder 33 performs signal processing on the master video using the BD format option B HDR technique to generate an option B HDR video. The option B HDR encoder 33 encodes the option B HDR video in a predetermined encoding system, and outputs the option B HDR video stream obtained by the encoding to the multiplexer 35.

The SDR encoder 34 compresses the dynamic range of the master video to generate an SDR video. The SDR encoder 34 encodes the SDR video in a predetermined encoding system, and outputs the SDR video stream obtained by the encoding to the multiplexer 35.

The operations of the encoders are controlled by the controller 21. That is, the mandatory HDR encoder 31 performs operations to generate any type of HDR disc. In addition, the option A HDR encoder 32 performs operations to generate a mandatory/option A HDR disc or a mandatory/option A/option B HDR disc. The option B HDR encoder 33 performs operations to generate a mandatory/option B HDR disc or a mandatory/option A/option B HDR disc. The SDR encoder 34 performs operations to generate an HDR disc including an SDR video as well.

The multiplexer 35 multiplexes the video streams supplied from the encoders together with an audio streams and the like to generate an AV stream. The multiplexer 35 outputs the generated AV stream to the disc drive 23.

<Configuration of the Playing Apparatus 2>

Figure 15:
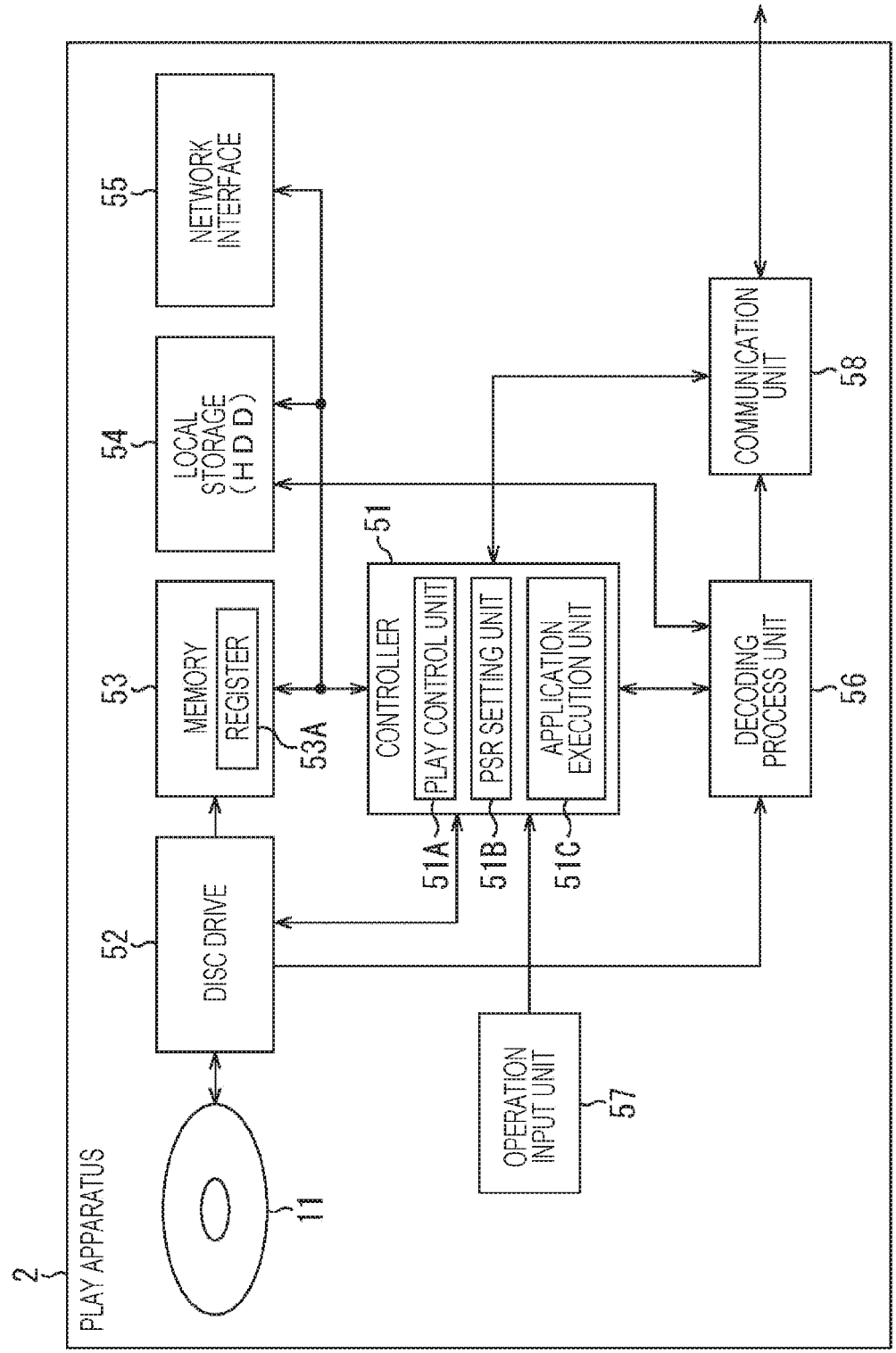
FIG. 15 is a block diagram illustrating a configuration example of a playing apparatus.

FIG. 15 is a block diagram illustrating a configuration example of the playing apparatus 2.

The playing apparatus 2 includes a controller 51, a disc drive 52, a memory 53, a local storage 54, a network interface 55, a decoding process unit 56, an operation input unit 57, and a communication unit 58.

The controller 51 includes a CPU, a ROM, a RAM, and the like. The controller 51 executes a predetermined program to control the entire operation of the playing apparatus 2.

The controller 51 executes a predetermined program to implement a play control unit 51A, a PSR setting unit 51B, and an application execution unit 51C.

The play control unit 51A acquires database information such as index tables, play lists, clip information and analyzes the same. The play control unit 51A controls the decoding process unit 56 or the like to play contents.

The PSR setting unit 51B writes information into a register 53A formed in the memory 53 or rewrites the information stored in the register 53A. The PSR setting unit 51B writes information and the like before the playing of the content recorded on the disc 11 is started.

The application execution unit 51C acquires the BD-J object file read from the disc 11 and executes the play application. By executing the play application, the application execution unit 51C controls the display of the menu screen and the playing of the HDR videos.

The disc drive 52 reads and acquires data from the disc 11, and outputs the acquired data to the controller 51, the memory 53, or the decoding process unit 56. For example, the disc drive 52 outputs the database information to the controller 51, and outputs the AV stream to the decoding process unit 56.

The memory 53 stores data and the like necessary for the controller 51 to execute various processes. The memory 53 has the register 53A as a PSR. The register 53A stores various kinds of information indicating the capabilities of the playing apparatus 2 as a BD player and the current settings of the playing apparatus 2. The information stored in the register 53A is referred to at the time of playing the disc 11.

The local storage 54 includes a hard disk drive (HDD), for example. The local storage 54 records streams and the like downloaded from a server.

The network interface 55 communicates with the server via a network such as the internet and supplies the data downloaded from the server to the local storage 54.

The decoding process unit 56 decodes the HDR video or the SDR video multiplexed with the AV stream supplied from the disc drive 52 and outputs the video data obtained by the decoding to the communication unit 58.

The operation input unit 57 includes input devices such as buttons, keys, and a touch panel, and a reception unit that receives infrared signals and the like transmitted from a predetermined remote commander. The operation input unit 57 detects the user's operation and supplies the signal indicative of the detected operation to the controller 51.

The communication unit 58 communicates with the display apparatus 3 via the cable 4. For example, the communication unit 58 acquires information on the display performance of the display in the display apparatus 3, and outputs the same to the controller 51. The communication unit 58 also outputs the video data supplied from the decoding process unit 56 to the display apparatus 3.

Figure 16:
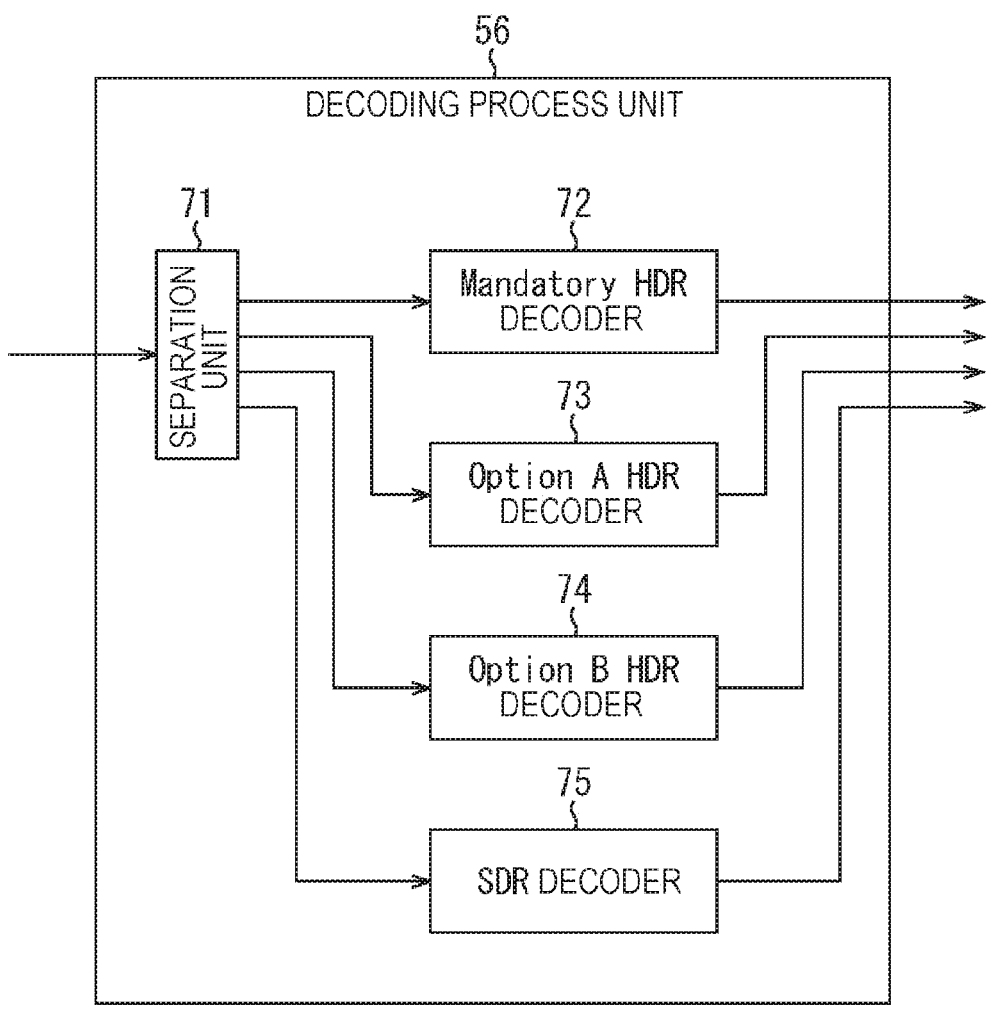
FIG. 16 is a block diagram illustrating a configuration example of a decoding process unit illustrated in FIG. 15.

FIG. 16 is a block diagram illustrating a configuration example of the decoding process unit 56 illustrated in FIG. 15.

The decoding process unit 56 includes a separation unit 71, a mandatory HDR decoder 72, an option A HDR decoder 73, an option B HDR decoder 74, and an SDR decoder 75. The playing apparatus 2 having the mandatory HDR decoder 72, the option A HDR decoder 73, and the option B HDR decoder 74 is a mandatory/option A/option B HDR-compatible player. The AV stream read by the disc drive 52 is input into the separation unit 71.

The separation unit 71 separates the video stream to be played from the AV stream under the control of the controller 51, and outputs the same to the decoders. To play a mandatory HDR video, the separation unit 71 separates a mandatory HDR video stream and outputs the same to the mandatory HDR decoder 72. In addition, to play an option A HDR video, the separation unit 71 separates an option A HDR video stream and outputs the same to the option A HDR decoder 73. To play an option B HDR video, the separation unit 71 separates an option B HDR video stream and outputs the same to the option B HDR decoder 74. To play an SDR video, the separation unit 71 separates an SDR video stream and outputs the same to the SDR decoder 75.

The mandatory HDR decoder 72 decodes the mandatory HDR video stream supplied from the separation unit 71, and outputs the mandatory HDR video data obtained by the decoding.

The option A HDR decoder 73 decodes the option A HDR video stream supplied from the separation unit 71, and outputs the option A HDR video data obtained by the decoding.

The option B HDR decoder 74 decodes the option B HDR video stream supplied from the separation unit 71, and outputs the option B HDR video data obtained by the decoding.

The SDR decoder 75 decodes the SDR video stream supplied from the separation unit 71, and outputs the SDR video data obtained by the decoding.

<About PSRs>

FIG. 17 is a diagram illustrating an example of assignment of PSRs.

In the BD, the PSRs are assigned PSR numbers and the uses of the PSRs are prescribed. For example, a PSR 0 with PSR number 0 is a region for interactive graphics that stores an interactive graphics stream number.

As illustrated in FIG. 17, a PSR 25 is newly defined as a region for HDR output mode preference. The HDR output mode preference is information indicating the type of the HDR video to be preferentially played, out of the mandatory HDR video, the option A HDR video, and the option B HDR video.

As illustrated in FIG. 17, a PSR 26 is newly defined as a region for HDR video capability. The HDR video capability is information indicating the performance of the playing apparatus 2 in playing HDR videos.

A PSR 27 is a newly defined as a region for HDR video display capability. The HDR video display capability is information indicating the performance of the display in the display apparatus 3 in displaying HDR videos.

The regions PSR 25, PSR 26, and PSR 27 are reserved regions in BD-ROM format part 3 version 2.4. Alternatively, the region for HDR output mode preference, the region for HDR video capability, and the region for HDR video display capability may be assigned to other reserved regions.

Figure 18:
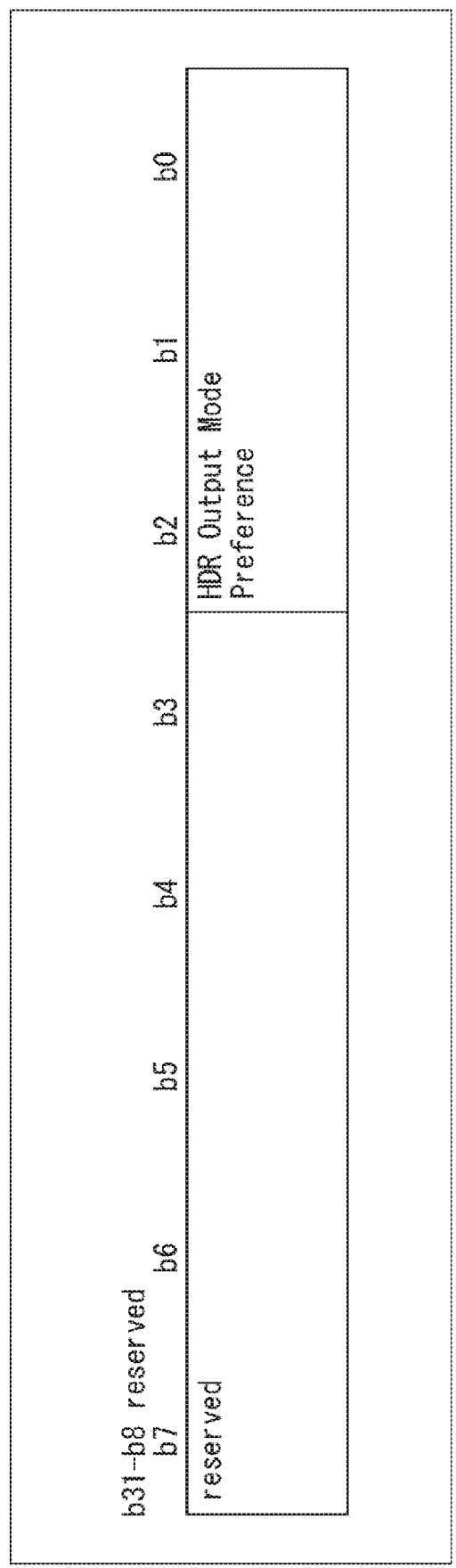
FIG. 18 is a diagram illustrating an example of a PSR 25.

FIG. 18 is a diagram illustrating an example of the PSR 25.

The PSR 25 is a 32-bit region in which three bits of b0, b1, and b2 are assigned for the HDR output mode preference.

FIG. 19 is a diagram illustrating the meanings of values of the HDR output mode preference.

The HDR output mode preference of 000b means that the mandatory HDR video is to be preferentially played.

The HDR output mode preference of 001b means that the option A HDR video is to be preferentially played.

The HDR output mode preference of 010b means that the option B HDR video is to be preferentially played.

The values 011b to 111b are used to, when there are three or more types of option HDR videos, represent the respective HDR videos to be preferentially played.

The HDR output mode preference having the foregoing meanings are referred to, for example, when a plurality of types of HDR videos is recorded on the disc 11 and there are a plurality of HDR videos that can be played by the playing apparatus 2 and can be displayed by the display apparatus 3.

Figure 20:
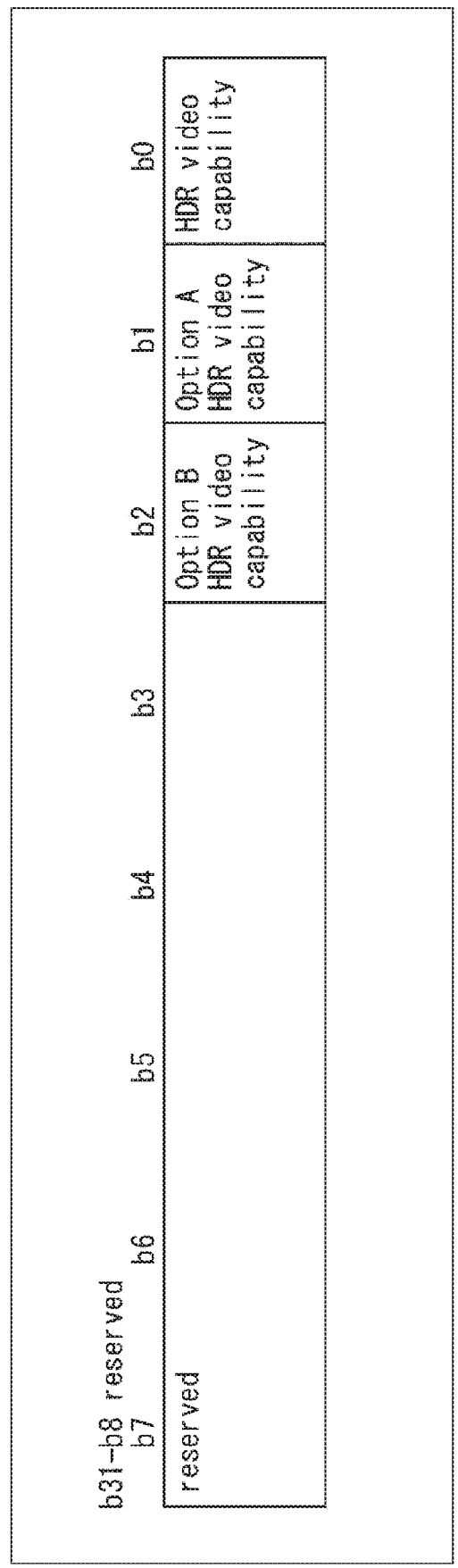
FIG. 20 is a diagram illustrating an example of a PSR 26.

FIG. 20 is a diagram illustrating an example of the PSR 26.

The PSR 26 is a 32-bit region in which one bit of b0 is assigned for the HDR video capability, one bit of b1 is assigned for the option A HDR video capability, and one bit of b2 is assigned for the option B HDR video capability.

The HDR video capability of 0b means that the playing of the mandatory HDR video is disabled, that is, only the SDR video can be played. The HDR video capability of 1b means that the playing of the mandatory HDR video is enabled.

The option A HDR video capability of 0b means that the playing of the option A HDR video is disabled, and the option A HDR video capability of 1b means that the playing of the option A HDR video is enabled.

The option B HDR video capability of 0b means that the playing of the option B HDR video is disabled, the option B HDR video capability of 1b means that the playing of the option B HDR video is enabled.

The controller 51 refers to the information of the PSR 26 reserved in the register 53A to determine whether the playing apparatus 2 can play HDR videos and, when the playing apparatus 2 can play HDR videos, identify the types of the playable HDR videos.

FIG. 21 is a diagram illustrating of an example of the PSR 27.

The PSR 27 is a 32-bit region in which one bit of b0 is assigned for the HDR video display capability, one bit of b1 is assigned for the option A HDR video display capability, and one bit of b2 is assigned for the option B HDR video display capability.

The HDR video display capability of 0b means that the display of the mandatory HDR video is disabled, that is, only the SDR video can be displayed, and the HDR video display capability of 1b means that the display of the mandatory HDR video is enabled.

The option A HDR video display capability of 0b means that the display of the option A HDR video is disabled, and the option A HDR video display capability of 1b means that the display of the option A HDR video is enabled.

The option B HDR video display capability of 0b means that the display of the option B HDR video is disabled, and the option B HDR video display capability of 1b means that the display of the option B HDR video is enabled.

The controller 51 refers to the information of the PSR 27 reserved in the register 53A to determine whether the display in the display apparatus 3 can display HDR videos, and when the display in the display apparatus 3 can display HDR videos, identify the types of the displayable HDR videos.

The information related to playing of HDR videos may not be recorded in the reserved regions but may be recorded together with other information in the regions already assigned for other purposes.

<Configuration of the Display Apparatus 3>

Figure 22:
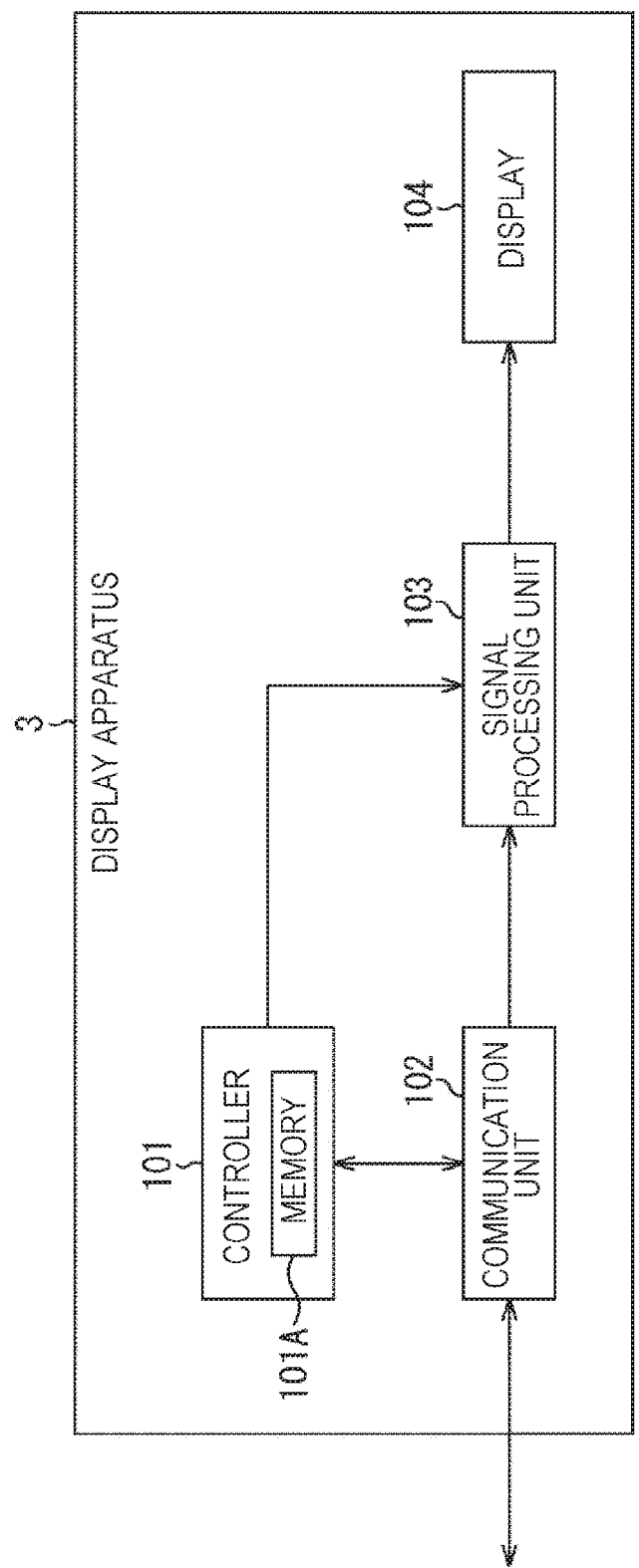
FIG. 22 is a block diagram illustrating a configuration example of a display apparatus.

FIG. 22 is a block diagram illustrating a configuration example of the display apparatus 3.

The display apparatus 3 has a controller 101, a communication unit 102, a signal processing unit 103, and a display 104. The controller 101 has a memory 101A.

The controller 101 includes a CPU, a ROM, a RAM, and the like. The controller 101 executes a predetermined program to control the entire operation of the display apparatus 3.

For example, the controller 101 stores information indicating display performance of the display 104 in the memory 101A and manages the same. At the time of authentication with the playing apparatus 2, the controller 101 outputs the information stored in the memory 101A to the communication unit 102 such that the communication unit 102 transmits the same to the playing apparatus 2 by the use of EDID. On the basis of the EDID, the playing apparatus 2 identifies the display performance of the display 104.

The communication unit 102 communicates with the playing apparatus 2 via the cable 4. The communication unit 102 receives the video data from the playing apparatus 2 and outputs the same to the signal processing unit 103. The communication unit 102 also transmits the information supplied from the controller 101 to the playing apparatus 2.

The signal processing unit 103 processes the video data supplied from the communication unit 102 and displays the video on the display 104.

<<4. About the Operations of the Apparatuses>>

The operations of the apparatuses configured as described above will be explained here.

<Process by the Recording Apparatuses>

Figure 23:
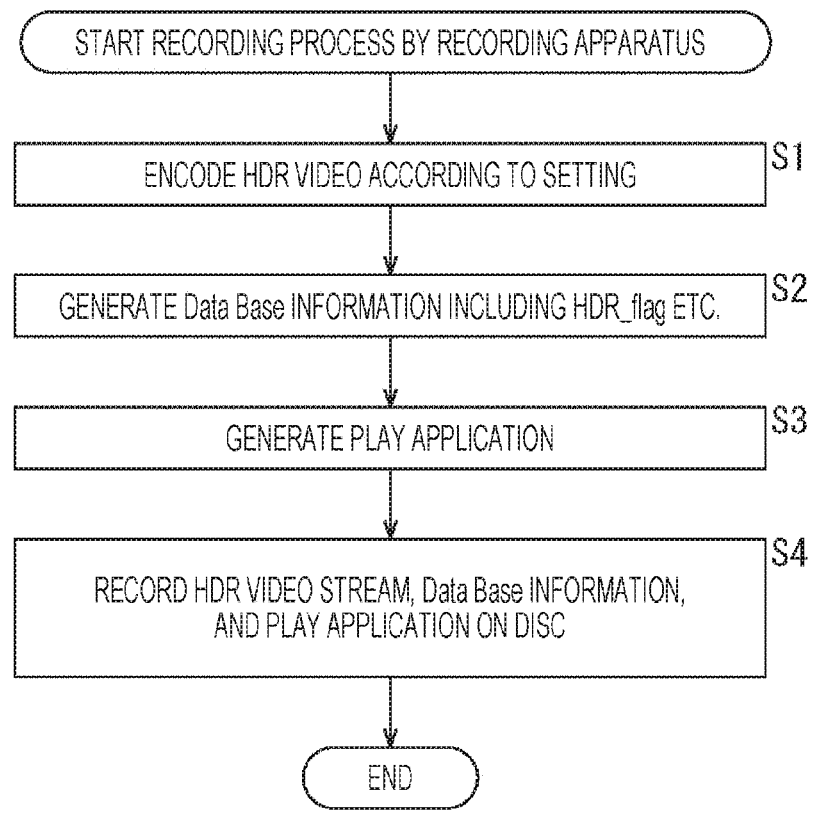
FIG. 23 is a flowchart of a recording process by a recording apparatus.

First, the recording process by the recording apparatus 1 will be explained with reference to the flowchart in FIG. 23. The process described in FIG. 23 is started when the master video data is input, for example.

At step S1, the encoding process unit 22 encodes the HDR video according to the setting. Specifically, when the creation of a mandatory HDR disc is set by the author of the content as the user of the recording apparatus 1, the mandatory HDR encoder 31 encodes the data to create a mandatory HDR video stream. In addition, when the creation of a mandatory/option A HDR disc is set, for example, the mandatory HDR encoder 31 and the option A HDR encoder 32 encode individually the data to create a mandatory HDR video stream and an option A HDR video stream. The created HDR video streams are multiplexed to create an AV stream.

At step S2, the database information generation unit 21A of the controller 21 generates the database information such as an index table and a play list including the information described in FIG. 11. Incidentally, as information defining a playing sequence, a plurality of play lists may be prepared for one disc. When there is a plurality of play lists, a play list to be used for playing is determined by the user's operation or the like.

At step S3, the play application generation unit 21B generates a play application on the basis of the information input from the outside.

At step S4, the disc drive 23 records a file of the AV stream including the HDR video, a file of the database information, and a BD-J object file storing the play application on the disc 11. After that, the process is terminated.

<Process by the Playing Apparatus>

Figure 24:
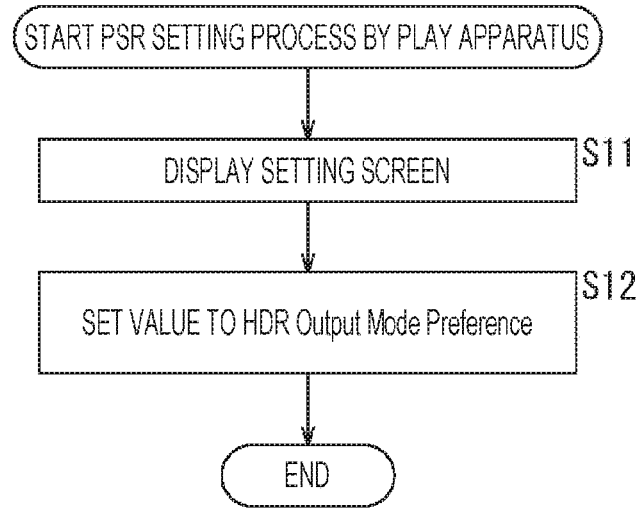
FIG. 24 is a flowchart of a PSR setting process by a playing apparatus.

Next, the process of setting the HDR output mode preference to the PSR by the playing apparatus 2 will be explained with reference to the flowchart of FIG. 24. The process described in FIG. 24 is started when the user provides an instruction for making the setting on the playing of the HDR video, for example.

At step S11, the PSR setting unit 51B of the controller 51 controls the communication unit 58 and communicates with the display apparatus 3 to display a setting screen on the display 104 of the display apparatus 3.

Figure 25:
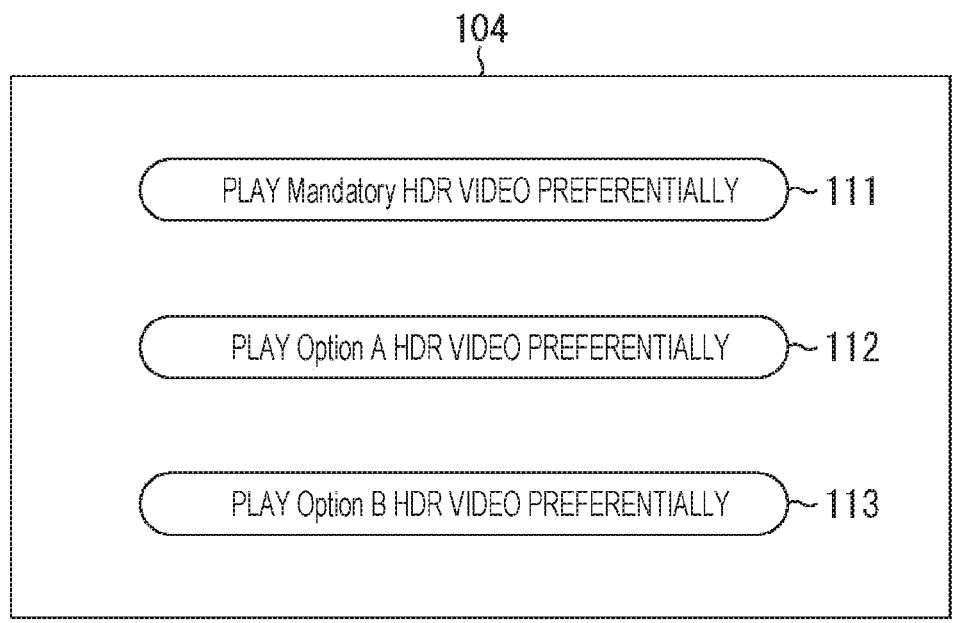
FIG. 25 is a diagram illustrating an example of a setting screen.

FIG. 25 is a diagram illustrating an example of the setting screen.

The setting screen includes a button 111, a button 112, and a button 113. The button 111 is a button that is operated to set a mandatory HDR video as the HDR video to be preferentially played. The button 112 is a button that is operated to set an option A HDR video as the HDR video to be preferentially played. The button 113 is a button that is operated to set an option B HDR video as the HDR video to be preferentially played.

The user operates the remote controller in the playing apparatus 2 or the like and uses the setting screen illustrated in FIG. 25 to select the type of the HDR video to be preferentially played. The information indicating the user's operation is supplied from the operation input unit 57 to the PSR setting unit 51B.

At step S12, the PSR setting unit 51B sets the value of the HDR output mode preference of the PSR 25 formed in the register 53A as the value indicating the type of the HDR video selected by the user. After that, the process is terminated.

Alternatively, the value of the HDR output mode preference may be set in advance in an unchangeable manner.

Next, the process of acquiring information indicating display performance of the display by the playing apparatus 2 will be explained with reference to the flowchart of FIG. 26.

Figure 26:
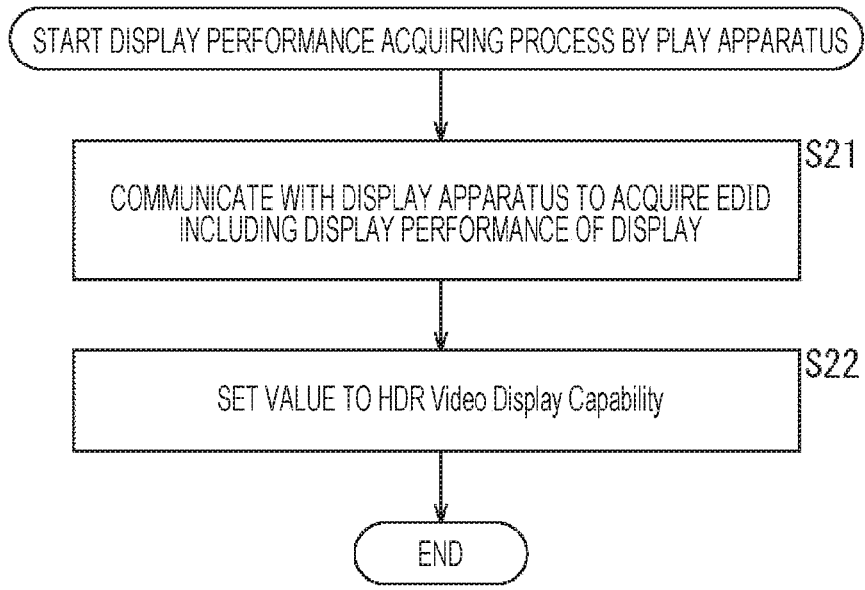
FIG. 26 is a flowchart of a display performance acquiring process by the playing apparatus.

The process described in FIG. 26 is started when the playing apparatus 2 and the display apparatus 3 are connected together via the cable 4 and they are powered on, for example.

At step S21, the communication unit 58 communicates with the display apparatus 3 to acquire EDID including the information indicating display performance of the display 104. The communication unit 58 outputs the information indicating the display performance of the display 104 to the controller 51.

At step S22, the PSR setting unit 51B of the controller 51 recognizes the display performance of the display 104 on the basis of the information supplied from the communication unit 58. The PSR setting unit 51B sets the value of the HDR video display capability of the PSR 27 formed in the register 53A as the value according to the display performance of the display 104. After that, the process is terminated.

Incidentally, the HDR video capability of the PSR 26 is preset to a value according to the playing performance of the playing apparatus 2.

First Playing Process

Next, the process of playing the disc 11 according to the PSR settings as described above by the playing apparatus 2 will be explained.

Figure 27:
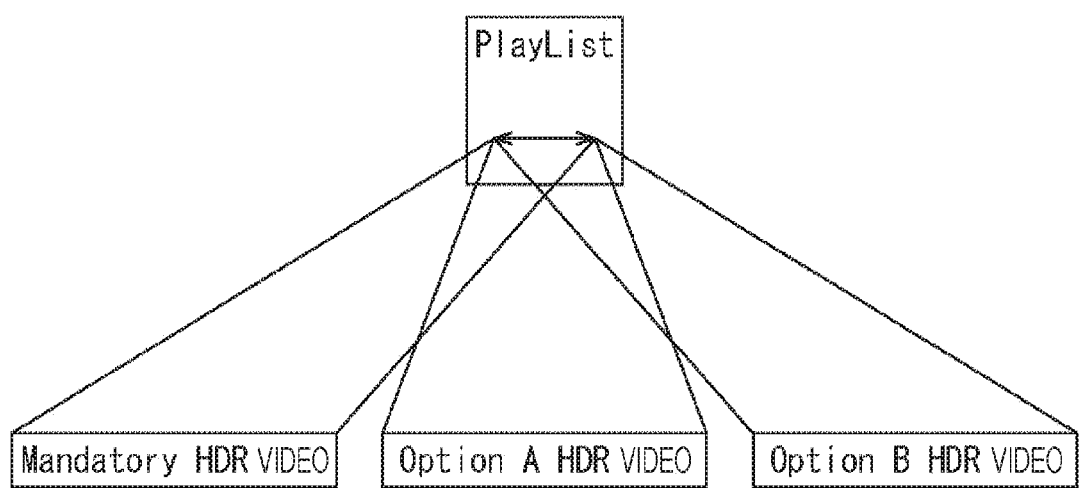
FIG. 27 is a diagram illustrating an example of relations between a play list and HDR videos.

FIG. 27 is a diagram illustrating an example of relations between a play list and HDR videos.

In the example of FIG. 27, one play list is associated with an AV stream including a mandatory HDR video, an AV stream including an option A HDR video, and an AV stream including an option B HDR video. The play list illustrated in FIG. 27 includes information indicating respective play sections of the AV streams of the mandatory HDR video, the option A HDR video, and the option B HDR video.

The playing process in the case where one play list is associated with three types of AV streams as illustrated in FIG. 27 will be explained with reference to the flowchart of FIG. 28.

Incidentally, the playing apparatus 2 is a mandatory/option A/option B HDR-compatible player. In addition, the disc 11 is a mandatory/option A/option B HDR disc, and the display 104 in the display apparatus 3 is a mandatory/option A/option B HDR-compatible display.

At step S31, the play control unit 51A of the controller 51 controls the disc drive 52 to read the database information from the disc 11. The play control unit 51A acquires the database information read from the disc drive 52.

At step S32, the play control unit 51A analyzes the database information including the index table and refers to the information in the HDR_flag, the option_A_HDR_flag, and the option_B_HDR_flag. The play control unit 51A identifies the disc 11 as a mandatory/option A/option B HDR disc.

At step S33, the play control unit 51A refers to the value of the HDR video capability in the PSR 26 and the value of the HDR video display capability in the PSR 27. The play control unit 51A identifies the playing apparatus 2 as a mandatory/option A/option B HDR-compatible player, and the display 104 in the display apparatus 3 as a mandatory/option A/option B HDR-compatible display.

At step S34, the play control unit 51A selects the play list to be used for playing the HDR video.

At step S35, the play control unit 51A refers to the value of the HDR output mode preference in the PSR 25.

At step S36, the play control unit 51A determines the HDR video to be played on the basis of the value of the HDR output mode preference.

At step S37, the play control unit 51A controls the disc drive 52 to read the AV stream including the HDR video determined to be played from the disc 11. The AV stream acquired from the disc drive 52 is supplied to the decoding process unit 56.

At step S38, the decoding process unit 56 decodes the stream of the HDR video multiplexed with the AV stream supplied from the disc drive 52, and outputs the HDR video data obtained by the decoding to the communication unit 58.

At step S39, the communication unit 58 outputs the HDR video data supplied from the decoding process unit 56 to the display apparatus 3. Upon receipt of the data output from the communication unit 58, the display apparatus 3 performs signal processing on the received data and displays the HDR video on the display 104. Steps S37 to S39 are repeated until the playing of the content is terminated.

Figure 29:
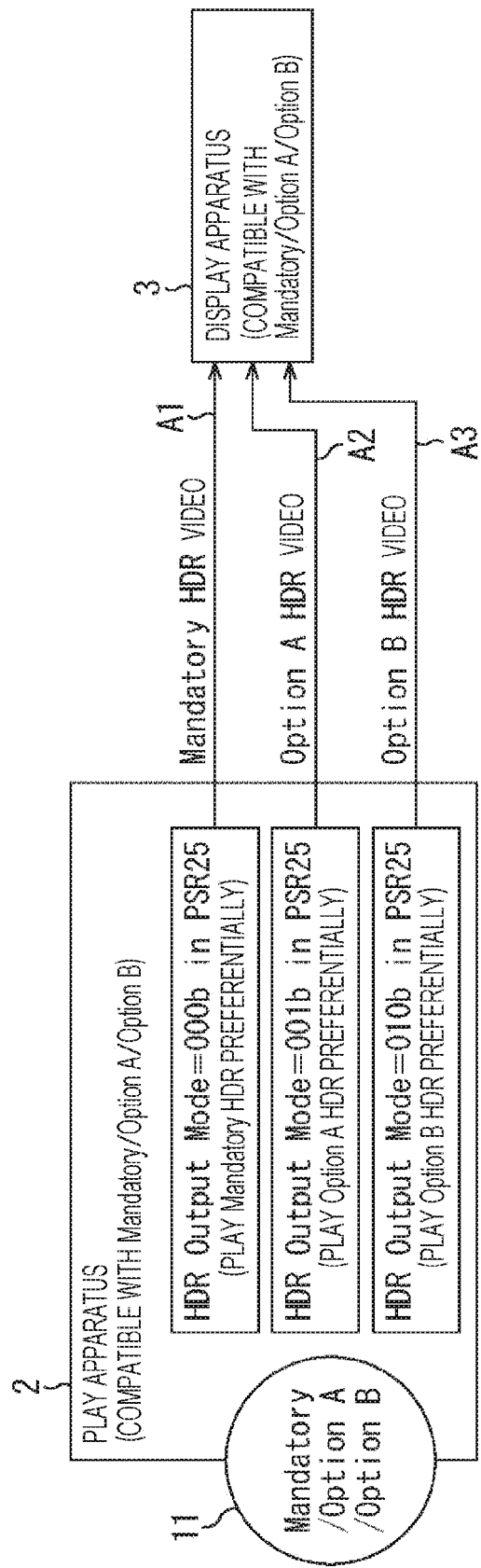
FIG. 29 is a diagram illustrating a specific example of display of HDR videos.

FIG. 29 is a diagram illustrating a specific example of display of HDR videos.

When the value of the HDR output mode preference is set to 000b, the mandatory HDR video out of the three types of HDR videos associated with the play list for use in the playing is preferentially played as illustrated by arrow A1.

In addition, when the value of the HDR output mode preference is set to 001b, the option A HDR video out of the three types of HDR videos associated with the play list for use in the playing is preferentially played as illustrated by arrow A2.

When the value of the HDR output mode preference is set to 010b, the option B HDR video out of the three types of HDR videos associated with the play list for use in the playing is preferentially played as illustrated by arrow A3.

The foregoing process allows the playing apparatus 2 to play the HDR video set by the user as the HDR video to be preferentially played out of the HDR videos that can be played by the playing apparatus 2 and can be displayed by the display 104.

The playing apparatus 2 can play the HDR video reflecting the user setting to provide the user with comfortable viewing experience.

Second Playing Process

Figure 30:
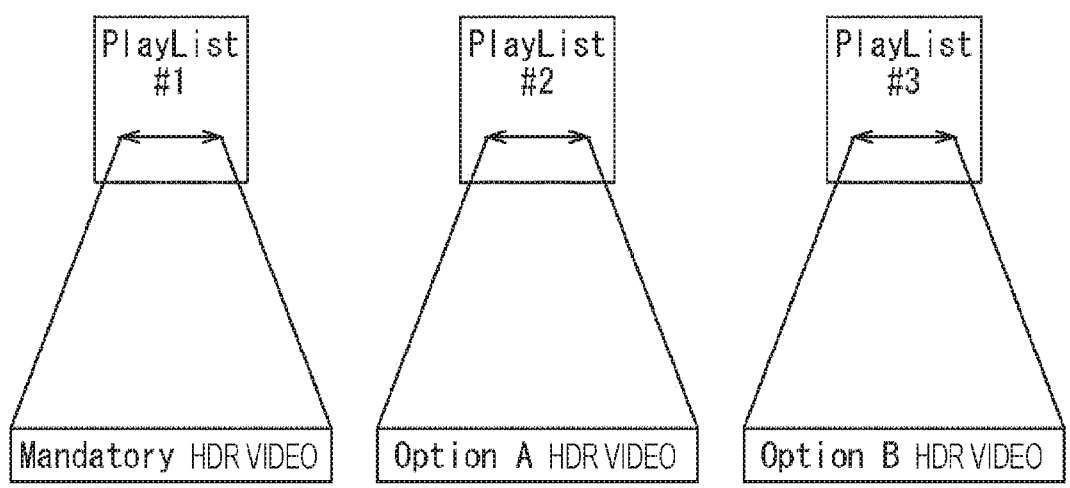
FIG. 30 is a diagram illustrating another example of relations between play lists and HDR videos.

FIG. 30 is a diagram illustrating another example of relations between play lists and HDR videos.

In the example of FIG. 30, one play list is associated with an AV stream including one HDR video. Referring to FIG. 30, a play list #1 is a play list for use in the playing of a mandatory HDR video, a play list #2 is a play list for use in the playing of an option A HDR video, and a play list #3 is a play list for use in the playing of an option B HDR video. The disc 11 records the three play lists #1 to #3. The play lists #1 to #3 include information indicating respective play sections of the mandatory HDR video, the option A HDR video, and the option B HDR video.

With reference to the flowchart of FIG. 31, descriptions will be given here as to the playing process in the case where three play lists are associated with one each type of AV stream as illustrated in FIG. 30.

In this example as well, the playing apparatus 2 is a mandatory/option A/option B HDR-compatible player. In addition, the disc 11 is a mandatory/option A/option B HDR disc, and the display 104 in the display apparatus 3 is a mandatory/option A/option B HDR-compatible display.

Figure 28:
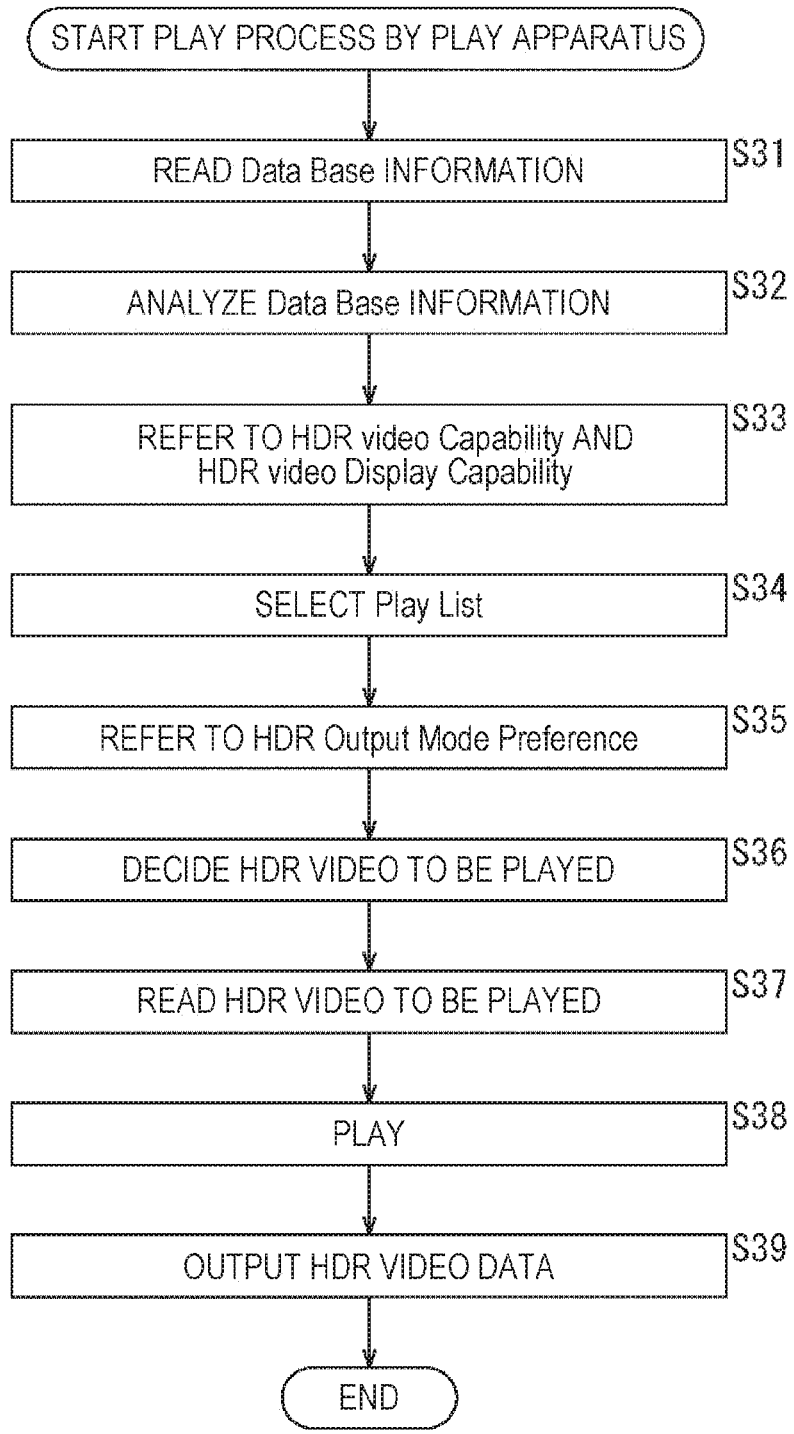
FIG. 28 is a flowchart of a playing process by the playing apparatus.

Steps S51 to S53 are similar to steps S31 to S33 described in FIG. 28. Specifically, at step S51, the play control unit 51A of the controller 51 controls the disc drive 52 to read the database information from the disc 11.

At step S52, the play control unit 51A analyzes the database information and refers to the information in HDR_flag, option_A_HDR_flag, and option_B_HDR_flag.

At step S53, the play control unit 51A refers to the value of the HDR video capability and the value of the HDR video display capability.

At step S54, the play control unit 51A controls the disc drive 52 to read the file of the play application from the disc 11. The application execution unit 51C acquires the file of the play application read from the disc drive 52.

At step S55, the application execution unit 51C executes the play application.

At step S56, the application execution unit 51C refers to the value of the HDR output mode preference in the PSR 25.

At step S57, the application execution unit 51C switches between the menu screens for use in the selection of the play list according to the value of the HDR output mode preference and displays the same.

Figure 32:
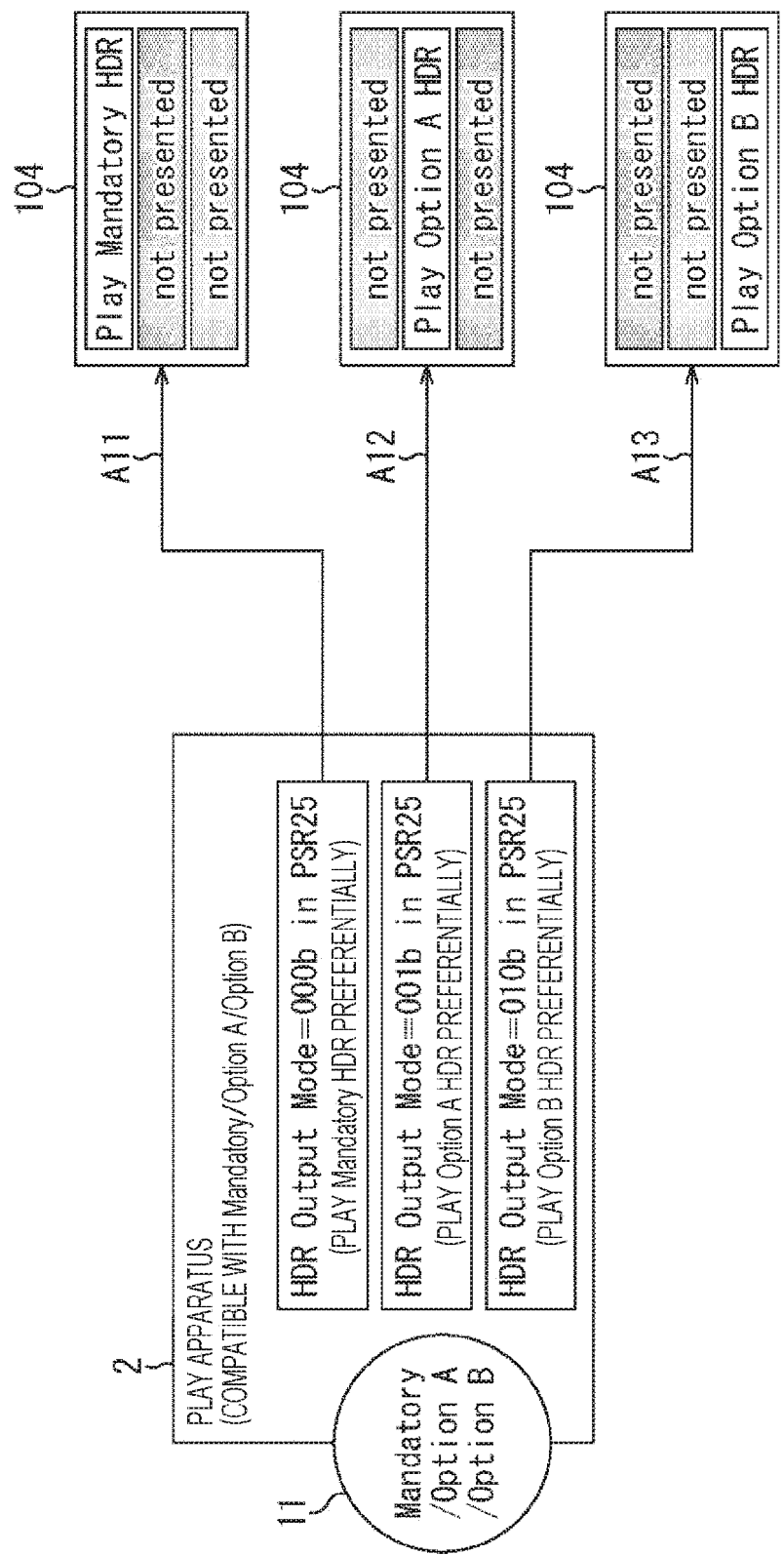
FIG. 32 is a diagram illustrating a specific example of display of menu screens.

FIG. 32 is a diagram illustrating a specific example of display of menu screens.

When the value of the HDR output mode preference is set to 000b, the application execution unit 51C displays the menu screen in which only the button for selecting the play list #1 associated with the mandatory HDR video can be operated as illustrated by arrow A11.

In the example of FIG. 32, the button for selecting the play list #2 associated with the option A HDR video and the button for selecting the play list #3 associated with the option B HDR video are grayed out.

With the menu screen displayed as described above, the user can recognize the mandatory HDR video as the type of the HDR video to be preferentially played. The user operates the button displayed in a selectable manner to select the play list #1 associated with the mandatory HDR video.

In addition, when the value of the HDR output mode preference is set to 001b, the application execution unit 51C displays the menu screen in which only the button for selecting the play list #2 associated with the option A HDR video can be operated as illustrated by arrow A12.

In the example of FIG. 32, the button for selecting the play list #1 associated with the mandatory HDR video and the button for selecting the play list #3 associated with the option B HDR video are grayed out.

The user operates the button displayed in a selectable manner to select the play list #2 associated with the option A HDR video.

When the value of the HDR output mode preference is set to 010b, the application execution unit 51C displays the menu screen in which only the button for selecting the play list #3 associated with the option B HDR video as illustrated by arrow A13. In the example of FIG. 32, the button for selecting the play list #1 associated with the mandatory HDR video and the button for selecting the play list #2 associated with the option A HDR video are grayed out.

The user operates the button displayed in a selectable manner to select the play list #3 associated with the option B HDR video.

Figure 31:
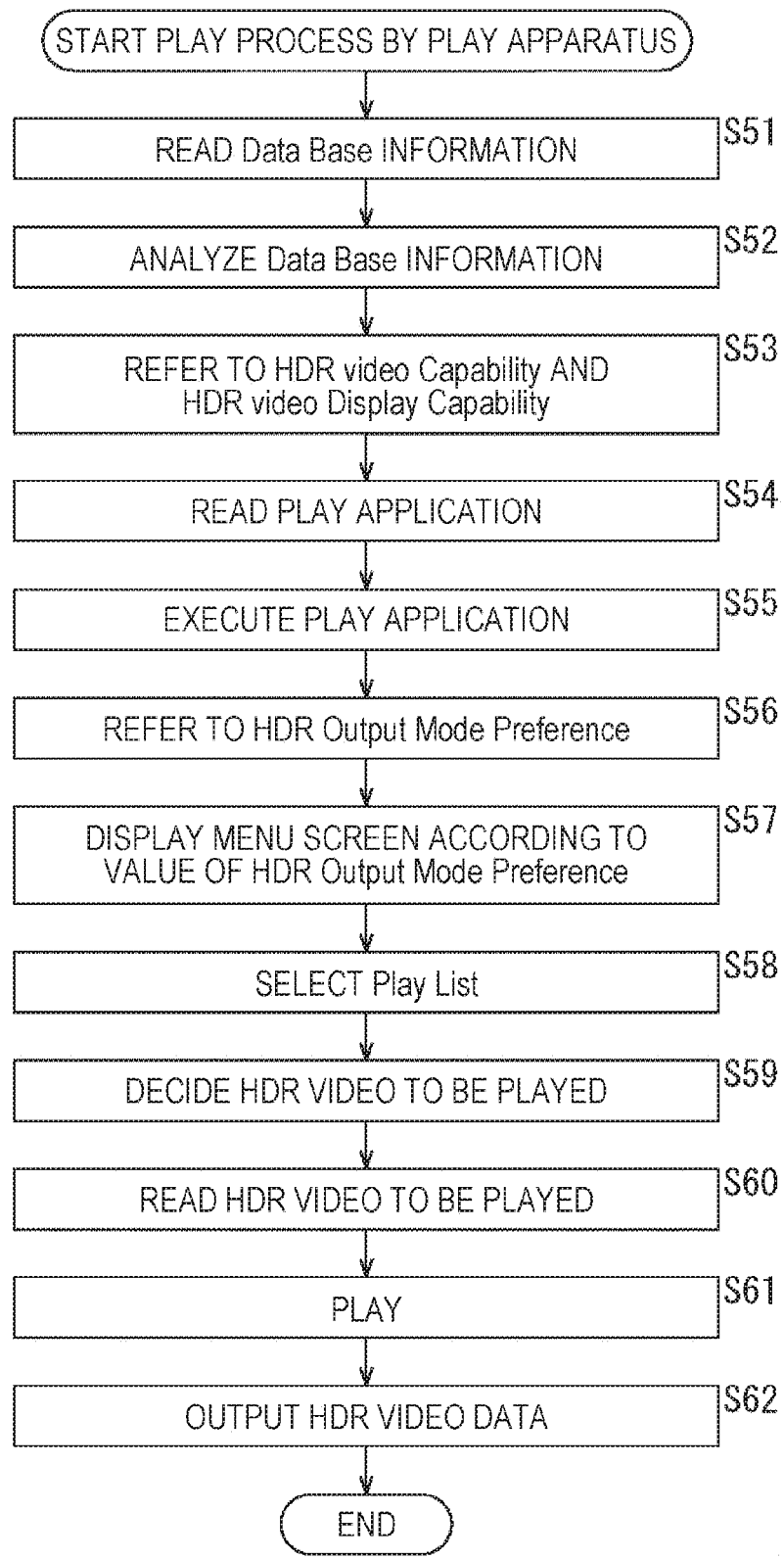
FIG. 31 is a flowchart of another playing process by the playing apparatus.

At step S58 described in FIG. 31, the application execution unit 51C selects the play list for use in the playing of the HDR video according to the user's operation in the menu screen.

At step S59, the application execution unit 51C determines the HDR video associated with the selected play list as the HDR video to be played.

At step S60, the application execution unit 51C controls the disc drive 52 to read the AV stream including the HDR video determined to be played from the disc 11. The AV stream acquired from the disc drive 52 is supplied to the decoding process unit 56.

At step S61, the decoding process unit 56 decodes the stream of the HDR video multiplexed with the AV stream supplied from the disc drive 52 and outputs the HDR video data obtained by the decoding to the communication unit 58.

At step S62, the communication unit 58 outputs the HDR video data supplied from the decoding process unit 56 to the display apparatus 3. Upon receipt of the data output from the communication unit 58, the display apparatus 3 performs signal processing on the received data and displays the HDR video on the display 104. Steps S60 to S62 are repeated until the playing of the content is terminated.

Thus, by switching between the menu screens according to the value of the HDR output mode preference, the playing apparatus 2 can play the HDR video set by the user as the HDR video to be preferentially played.

<<5. Modification Examples>>
<Another Example of PSR 25>

Figure 33:
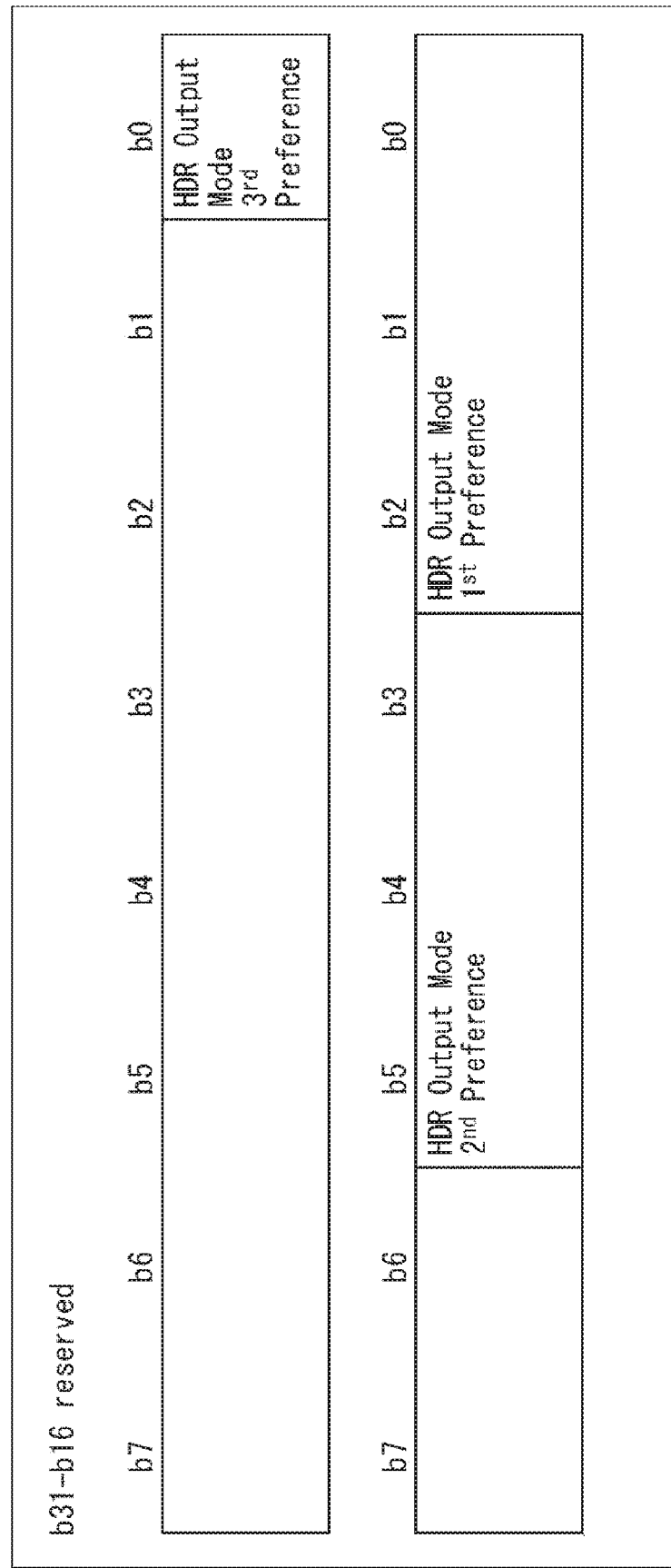
FIG. 33 is a diagram illustrating an example of the PSR 25.

FIG. 33 is a diagram illustrating an example of assignment of regions in the PSR 25.

In the example of FIG. 33, three bits of b0, b1, and b2 are assigned as HDR output mode 1st preference. In addition, three bits of b3, b4, and b5 are assigned as HDR output mode 2nd preference, and three bits of b6, b7, and b8 are assigned as HDR output mode 3rd preference.

The HDR output mode 1st preference is information indicating the type of the HDR video to be most preferentially played. The HDR output mode 2nd preference is information indicating the type of the HDR video to be second most preferentially played. The HDR output mode 3rd preference is information indicating the type of the HDR video to be third most preferentially played.

The meanings of the values are the same as those of the values of the HDR output mode preference described above with reference to FIG. 19, for example. The value 000b means that the mandatory HDR video is to be preferentially played, the value 001b means that the option A HDR video is to be preferentially played. The value 010b means that the option B HDR video is to be preferentially played. The values of the HDR output mode 1st preference, the HDR output mode 2nd preference, and the HDR output mode 3rd preference are set according to the user's selection.

When the HDR video of the type indicated by the HDR output mode 1st preference is not recorded on the disc 11 or cannot be displayed on the display 104, the playing apparatus 2 attempts to play the HDR video of the type indicated by the HDR output mode 2nd preference. Additionally, when the HDR video of the type indicated by the HDR output mode 2nd preference is not recorded on the disc 11 or cannot be displayed on the display 104, the playing apparatus 2 attempts to play the HDR video of the type indicated by the HDR output mode 3rd preference.

By setting the preference order of the HDR videos as described above, it is possible to play the HDR video reflecting the user preference even when one type of the HDR video selected by the video to be preferentially played is not recorded on the disc 11.

<Another Configuration Example>

In the foregoing example, the playing apparatus 2 is a mandatory/option A/option B HDR-compatible player. However, a similar process is carried out when the playing apparatus 2 has other playing capabilities.

Figure 34:
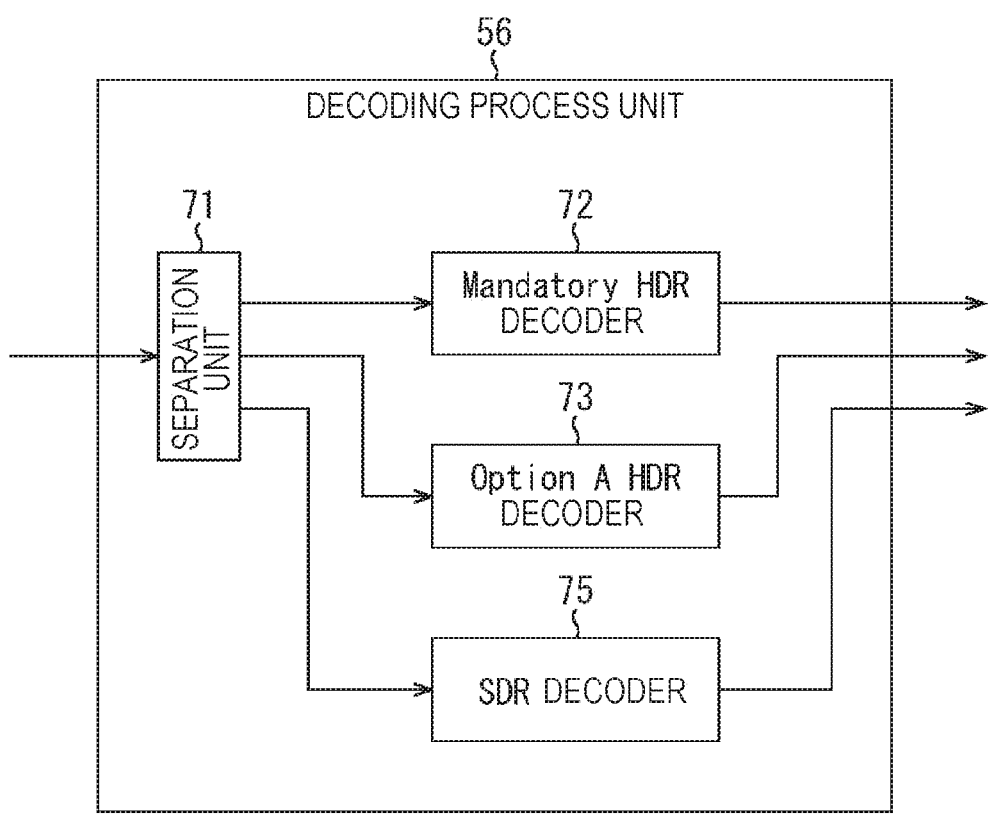
FIG. 34 is a block diagram illustrating a configuration example of a decoding process unit provided in a mandatory/option A HDR-compatible player.

FIG. 34 is a block diagram illustrating a configuration example of the decoding process unit 56 provided in the playing apparatus 2 as a mandatory/option A HDR-compatible player.

The configuration illustrated in FIG. 34 is the same as the configuration illustrated in FIG. 16 except that the option B HDR decoder 74 is not provided. The playing apparatus 2 configured as illustrated in FIG. 31 plays the mandatory HDR video or the option A HDR video according to the value of the HDR output mode preference.

Figure 35:
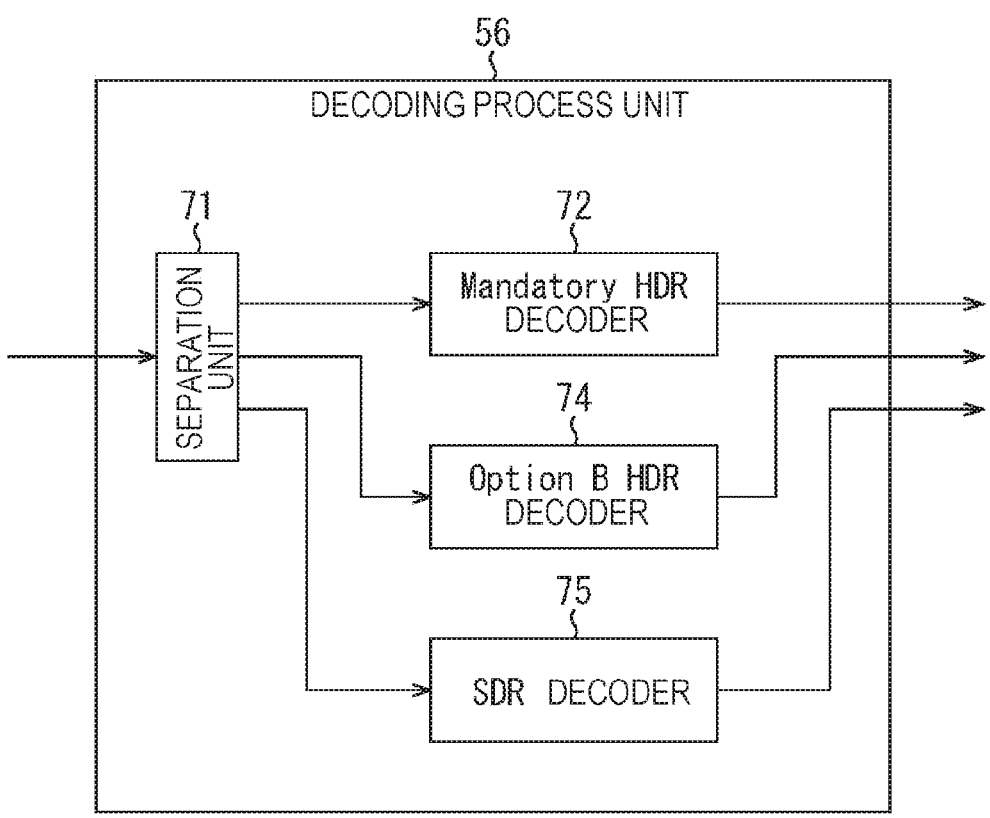
FIG. 35 is a block diagram illustrating a configuration example of a decoding process unit provided in a mandatory/option B HDR-compatible player.

FIG. 35 is a block diagram illustrating a configuration example of the decoding process unit 56 provided in the playing apparatus 2 as a mandatory/option B HDR-compatible player.

The configuration illustrated in FIG. 35 is the same as the configuration illustrated in FIG. 16 except that the option A HDR decoder 73 is not provided. The playing apparatus 2 configured as illustrated in FIG. 35 plays the mandatory HDR video or the option B HDR video according to the value of the HDR output mode preference.

<Others>

In the foregoing example, the play application for displaying the menu screen and selecting the play list is a BD-J application. Alternatively, a Movie object command may be used. The Movie object command is described in MovieObject file described in FIG. 9 and executed by the controller 51.

Configuration Example of a Computer

The series of process described above may be executed by hardware or software. When the series of process is executed by software, a program constituting the software is installed from a program recording medium into a computer incorporated into dedicated hardware, a general-purpose personal computer, or the like.

Figure 36:
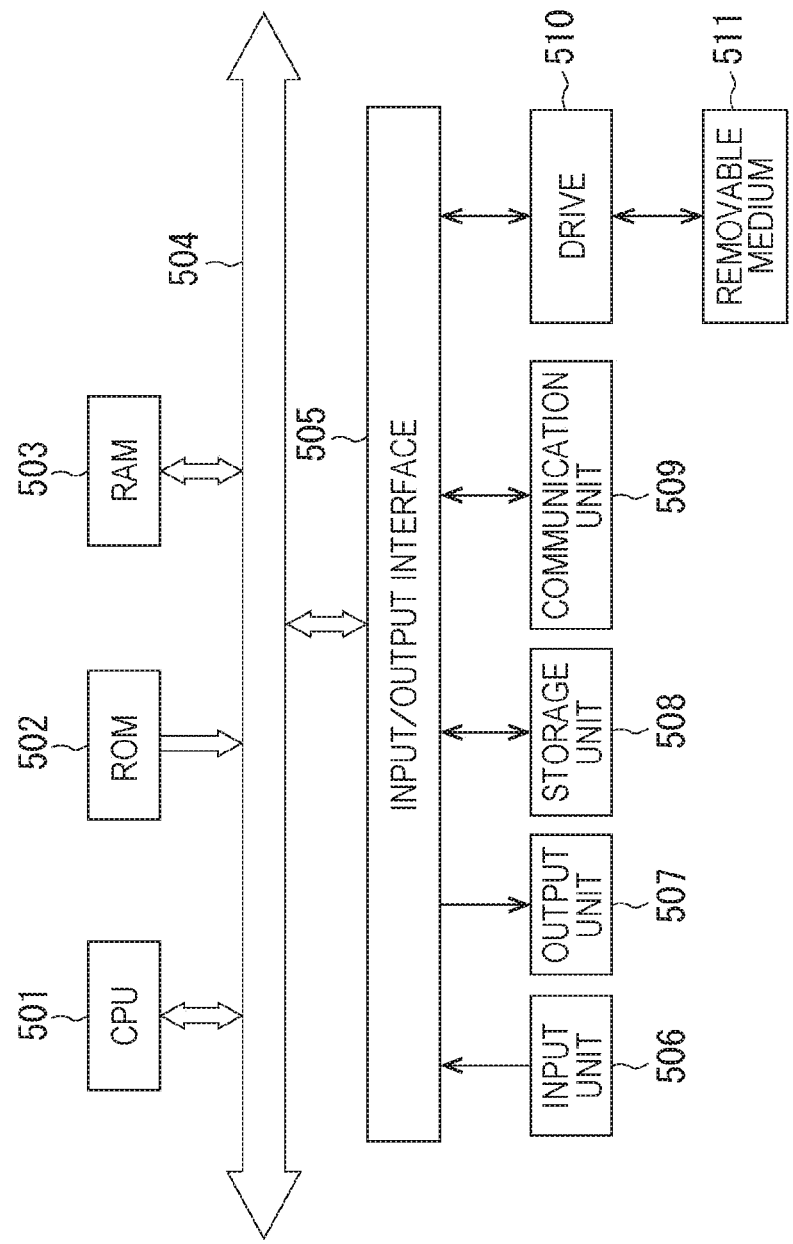
FIG. 36 is a block diagram illustrating a configuration example of a computer.

FIG. 36 is a block diagram illustrating a hardware configuration example of a computer that executes the foregoing series of process by a program.

A CPU 501, a ROM 502, and a RAM 503 are connected together via a bus 504.

The bus 504 further connects to an input/output interface 505. The input/output interface 505 connects to an input unit 506 including a keyboard, a mouse, and the like, and an output unit 507 including a display, a speaker, and the like. The input/output interface 505 also connects to a storage unit 508 including a hard disc, anon-volatile memory, and the like, a communication unit 509 including a network interface and the like, and a drive 510 driving a removable medium 511.

In the thus configured computer, the CPU 501 loads a program stored in the storage unit 508 into the RAM 503 via the input/output interface 505 and the bus 504, for example, to perform the series of processes described above.

The program executed by the CPU 501 is recorded on the removable medium 511 or provided via a wired or wireless transmission medium such as a local area network, the internet, or digital broadcasting, and is installed into the storage unit 508.

In addition, the program executed by the computer may be a program by which processes are carried out in time series according to the order described herein, or may be a program by which the processes are carried out in parallel or at necessary timings when a call is made or the like.

The system herein means an assembly of a plurality of constituent elements (apparatuses, modules (components), and others), and all the constituent elements may not be stored in the same housing. Therefore, the system may be formed by a plurality of apparatuses stored in separate housings and connected together via a network, or may be formed by one apparatus with a plurality of modules in one housing.

Additionally, the advantages described herein are mere examples and are not limited ones. Other advantages may be produced.

The embodiment of the present technology is not limited to the foregoing one, but can be modified in various manners without deviating from the gist of the present technology.

For example, the present technology can be configured as a cloud computing in which one function is shared and carried out by a plurality of apparatuses in cooperation via a network In addition, the steps in the flowcharts described above may be executed by one apparatus or may be shared and executed by a plurality of apparatuses in cooperation.

When one step includes a plurality of operations, the plurality of operations included in the one step may be executed by one apparatus or may be shared and executed by a plurality of devices in cooperation.

Examples of Combinations of Configurations

The present technology can have the following configurations:

(1)

A playing apparatus, including:

a storage unit that has regions for storing a plurality of units of information indicating the state of the playing apparatus including preference information indicating the type of an HDR video to be preferentially played, out of a first HDR video that is essential in including in a content an HDR video as a video in a wider brightness range than a standard brightness range and a second HDR video that is capable of being included in the content;

an acquisition unit that acquires encoded data of the HDR video to be preferentially played indicated by the preference information, out of encoded data of the first HDR video and encoded data of the second HDR video; and a decoding unit that decodes the encoded data acquired by the acquisition unit.

(2)

The playing apparatus according to (1), wherein the first HDR video and the second HDR video are HDR videos generated by different processes.

(3)

The playing apparatus according to (1) or (2), wherein the acquisition unit acquires the content from a recording medium attached to the playing apparatus.

(4)

The playing apparatus according to (3), wherein the acquisition unit acquires from the recording medium play management information including information indicating a play section of the encoded data of the first HDR video and a play section of the encoded data of the second HDR video, and the playing apparatus further includes a play control unit that, when the content is played using the play management information, controls the acquisition of the encoded data from the recording medium with reference to the preference information stored in the storage unit.

(5)

The playing apparatus according to (3), wherein the acquisition unit acquires from the recording medium data of a play application for use in playing the content, and the playing apparatus further includes an application execution unit that executes the play application acquired by the acquisition unit and controls the playing of the content with reference to the preference information stored in the storage unit.

(6)

The playing apparatus according to (5), wherein the application execution unit displays screens for indicating the type of the HDR video to be preferentially played in such a manner as to switch therebetween according to the preference information.

(7)

The playing apparatus according to (5) or (6), wherein the acquisition unit acquires from the recording medium first play management information including information indicating the play section of the encoded data of the first HDR video and second play management information including information indicating the play section of the encoded data of the second HDR video, and the application execution unit causes the decoding unit to decode the encoded data of the first HDR video of which the play section is indicated by the information included in the first play management information or decode the encoded data of the second HDR video of which the play section is indicated by the information included in the second play management information.

(8)

The playing apparatus according to any of (1) to (7), wherein the recording medium is a Blu-ray disc.

(9)

The playing apparatus according to any of (1) to (8), wherein the storage unit has a region for storing information indicating whether the playing apparatus is capable of playing the encoded data of the first HDR video and a region for storing information indicating whether the playing apparatus is capable of playing the encoded data of the second HDR video.

(10)

The playing apparatus according to any of (1) to (9), wherein the storage unit has a region for storing information indicating whether a display as the output destination of the HDR video is an apparatus capable of displaying the first HDR video and a region for storing information indicating whether the display as the output destination of the HDR video is an apparatus capable of displaying the second HDR video.

(11)

A playing method by a playing apparatus, including the steps of:

referring to preference information indicating the type of an HDR video to be preferentially played, out of a first HDR video that is essential in including in a content an HDR video as a video in a wider brightness range than a standard brightness range and a second HDR video that is capable of being included in the content, stored in a storage unit that has regions for storing a plurality of units of information indicating the state of the playing apparatus;

acquiring encoded data of the HDR video to be preferentially played indicated by the preference information, out of encoded data of the first HDR video and encoded data of the second HDR video; and decoding the acquired encoded data.

(12)

A program for causing a computer controlling a playing apparatus to execute a process including the steps of:

referring to preference information indicating the type of an HDR video to be preferentially played, out of a first HDR video that is essential in including in a content an HDR video as a video in a wider brightness range than a standard brightness range and a second HDR video that is capable of being included in the content, stored in a storage unit that has regions for storing a plurality of units of information indicating the state of the playing apparatus;

acquiring encoded data of the HDR video to be preferentially played indicated by the preference information, out of encoded data of the first HDR video and encoded data of the second HDR video; and decoding the acquired encoded data.

(13)

An information processing apparatus, including:

a video generation unit that generates encoded data of a first HDR video that is essential in including in a content an HDR video as a video in a wider brightness range than a standard brightness range and encoded data of a second HDR video that is capable of being included in the content, on the basis of a master video; and an application generation unit that generates a play application that is executed by a playing apparatus at the time of playing the content to control the playing of the content in such a manner as to, referring to preference information indicating the type of an HDR video to be preferentially played stored in a storage unit of the playing apparatus that has regions for storing a plurality of units of information indicating the state of the playing apparatus, play the encoded data of the HDR video to be preferentially played indicated by the preference information.

(14)

An information processing method, including the steps of:

generating encoded data of a first HDR video that is essential in including in a content an HDR video as a video in a wider brightness range than a standard brightness range and encoded data of a second HDR video that is capable of being included in the content, on the basis of a master video; and generating a play application that is executed by a playing apparatus at the time of playing the content to control the playing of the content in such a manner as to, referring to preference information indicating the type of an HDR video to be preferentially played stored in a storage unit of the playing apparatus that has regions for storing a plurality of units of information indicating the state of the playing apparatus, play the encoded data of the HDR video to be preferentially played indicated by the preference information.

(15)

A program for causing a computer to execute a process including the steps of:

generating encoded data of a first HDR video that is essential in including in a content an HDR video as a video in a wider brightness range than a standard brightness range and encoded data of a second HDR video that is capable of being included in the content, on the basis of a master video; and generating a play application that is executed by a playing apparatus at the time of playing the content to control the playing of the content in such a manner as to, referring to preference information indicating the type of an HDR video to be preferentially played stored in a storage unit of the playing apparatus that has regions for storing a plurality of units of information indicating the state of the playing apparatus, play the encoded data of the HDR video to be preferentially played indicated by the preference information.

(16)

A recording medium recording:

encoded data of a first HDR video that is essential in including in a content an HDR video as a video in a wider brightness range than a standard brightness range;

encoded data of a second HDR video that is capable of being included in the content; and a play application that is executed by a playing apparatus at the time of playing the content to control the playing of the content in such a manner as to, referring to preference information indicating the type of an HDR video to be preferentially played stored in a storage unit of the playing apparatus that has regions for storing a plurality of units of information indicating the state of the playing apparatus, play the encoded data of the HDR video to be preferentially played indicated by the preference information.

REFERENCE SIGNS LIST

1 Recording apparatus
2 Playing apparatus
3 Display apparatus
11 Disc
21 Controller
22 Encoding process unit
23 Disc drive
31 Mandatory HDR encoder
32 Option A HDR encoder
33 Option B HDR encoder
34 SDR encoder
35 Multiplexer
51 Controller
52 Disc drive
53 Memory
56 Decoding process unit
58 Communication unit
71 Separation unit
72 Mandatory HDR decoder
73 Option A HDR decoder
74 Option B HDR decoder
75 SDR decoder

The invention claimed is:

1. A playing apparatus, comprising:
a storage unit that has a plurality of regions to store a plurality of units of information indicating a state of the playing apparatus, wherein
the plurality of units of information includes preference information indicating a type of a preferred high dynamic range (HDR) video to be preferentially played,
the preferred HDR video is one of a first HDR video and a second HDR video,
the first HDR video is included in content as a first video in a brightness range wider than a standard brightness range, and
the second HDR video is capable of being included in the content;
an acquisition unit configured to:
acquire encoded data of the preferred HDR video to be preferentially played, wherein the encoded data is one of first encoded data of the first HDR video or second encoded data of the second HDR video; and
acquire third encoded data of a standard dynamic range (SDR) video as a second video in the standard brightness range based on absence of the preferred HDR video;

a separation unit configured to separate a video stream from one of the first encoded data, the second encoded data, or the third encoded data based on the preference information; and a decoding unit configured to decode the video stream.

2. The playing apparatus according to claim 1, wherein the first HDR video and the second HDR video are generated by different processes.

3. The playing apparatus according to claim 1, wherein the acquisition unit is further configured to acquire the content from a recording medium communicably coupled with the playing apparatus.

4. The playing apparatus according to claim 3, wherein
the acquisition unit is further configured to acquire play management information from the recording medium, wherein the play management information indicates a first play section of the first encoded data of the first HDR video and a second play section of the second encoded data of the second HDR video, and
the playing apparatus further comprises a play control unit configured to control the acquisition of the encoded data from the recording medium based on the preference information.

5. The playing apparatus according to claim 3, wherein
the acquisition unit is further configured to acquire, from the recording medium, data of a play application for playback of the content,
the playing apparatus further comprises an application execution unit, and
the application execution unit is configured to:
execute the play application; and
control the playback of the content based on the preference information.

6. The playing apparatus according to claim 5, wherein
the application execution unit is further configured to display a plurality of screens which indicate the type of the preferred HDR video,
the plurality of screens is displayed based on the preference information in such a manner as to switch therebetween.

7. The playing apparatus according to claim 5, wherein
the acquisition unit is further configured to acquire first play management information and second play management information from the recording medium, wherein
the first play management information indicates a first play section of the first encoded data of the first HDR video, and
the second play management information indicates a second play section of the second encoded data of the second HDR video, and
the application execution unit is further configured to control the decoding unit to decode one of the first encoded data of the first HDR video or the second encoded data of the second HDR video.

8. The playing apparatus according to claim 3, wherein the recording medium is a Blu-ray disc.

9. The playing apparatus according to claim 1, wherein
the plurality of regions comprises a first region to store first information and a second region to store second information,
the first information indicates capability of the playing apparatus to playback the first encoded data of the first HDR video, and
the second information indicates capability of the playing apparatus to playback the second encoded data of the second HDR video.

10. The playing apparatus according to claim 1, wherein
the plurality of regions comprises a first region to store first information and a second region to store second information,
the first information indicates capability of a display as an output destination of the preferred HDR video to display the first HDR video, and
the second information indicates capability of the display as the output destination of the preferred HDR video to display the second HDR video.

11. The playing apparatus according to claim 1, wherein the first HDR video comprises a mandatory HDR video and the second HDR video comprises one of an option A HDR video or an option B HDR video.

12. A playing method, comprising:
in a playing apparatus:
acquiring preference information indicating a type of a preferred high dynamic range (HDR) video to be preferentially played, wherein
the preferred HDR video is one of a first HDR video or a second HDR video,
the first HDR video is included in content as a first video in a brightness range wider than a standard brightness range,
the second HDR video is capable of being included in the content, and
the preference information is stored in a storage unit that has a plurality of regions for storing a plurality of units of information indicating a state of the playing apparatus;
acquiring encoded data of the preferred HDR video to be preferentially played, wherein the encoded data is one of first encoded data of the first HDR video or second encoded data of the second HDR video;
acquiring third encoded data of a standard dynamic range (SDR) video as a second video in the standard brightness range based on absence of the preferred HDR video;
separating a video stream from one of the first encoded data, the second encoded data, or the third encoded data based on the preference information; and
decoding the video stream.

13. A non-transitory computer-readable medium having stored thereon, computer-executable instructions which, when executed by a playing apparatus, cause the playing apparatus to execute operations, the operations comprising:
acquiring preference information indicating a type of a preferred high dynamic range (HDR) video to be preferentially played, wherein
the preferred HDR video is one of a first HDR video or a second HDR video,
the first HDR video is included in content as a first video in a brightness range wider than a standard brightness range,
the second HDR video is capable of being included in the content, and
the preference information is stored in a storage unit that has a plurality of regions for storing a plurality of units of information indicating a state of the playing apparatus;
acquiring encoded data of the preferred HDR video to be preferentially played indicated by the preference information, wherein the encoded data is one of first encoded data of the first HDR video or second encoded data of the second HDR video;

acquiring third encoded data of a standard dynamic range (SDR) video as a second video in the standard brightness range, based on absence of the preferred HDR video;

separating a video stream from one of the first encoded data, the second encoded data, or the third encoded data based on the preference information; and decoding the video stream.

14. An information processing apparatus, comprising:
a video generation unit configured to:
  generate first encoded data of a first high dynamic range (HDR) video that is included in content as a first video in a brightness range wider than a standard brightness range;
  generate second encoded data of a second HDR video capable of being included in the content; and
  generate third encoded data of a standard dynamic range (SDR) video as a second video in the standard brightness range, based on a master video; and
an application generation unit configured to:
  generate a play application that is executed by a playing apparatus to:
    control playback of the content based on preference information indicating a type of a preferred HDR video to be preferentially played and stored in a storage unit of the playing apparatus, wherein
      the preferred HDR video is one of the first HDR video or the second HDR video, and
      the storage unit has a plurality of regions to store a plurality of units of information indicating a state of the playing apparatus;
    play encoded data of the preferred HDR video to be preferentially played, wherein the encoded data is one of the first encoded data or the second encoded data;
    play the third encoded data of the SDR video as the video in the standard brightness range based on absence of the preferred HDR video;
    separate a video stream from one of the first encoded data, the second encoded data, or the third encoded data based on the preference information; and
    decode the video stream.

15. An information processing method, comprising:
generating first encoded data of a first high dynamic range (HDR) video that is included in content as a first video in a brightness range wider than a standard brightness range;
generating second encoded data of a second HDR video capable of being included in the content; and
generating third encoded data of a standard dynamic range (SDR) video as a second video in the standard brightness range, based on a master video; and
generating a play application that is executed by a playing apparatus to:
  control playing of the content based on preference information indicating a type of a preferred HDR video to be preferentially played and stored in a storage unit of the playing apparatus, wherein
    the preferred HDR video is one of the first HDR video or the second HDR video, and
    the storage unit has a plurality of regions for storing a plurality of units of information indicating a state of the playing apparatus;
  play encoded data of the preferred HDR video to be preferentially played, wherein the encoded data is one of the first encoded data or the second encoded data;
  play the third encoded data of the SDR video as the second video in the standard brightness range based on absence of the preferred HDR video;
  separate a video stream from one of the first encoded data, the second encoded data, or the third encoded data based on the preference information; and
  decode the video stream.

16. A non-transitory computer-readable medium having stored thereon, computer-executable instructions which, when executed by an information processing apparatus, cause the information processing apparatus to execute operations, the operations comprising:
generating first encoded data of a first high dynamic range (HDR) video that is included in content as a first video in a brightness range wider than a standard brightness range;
generating second encoded data of a second HDR video capable of being included in the content; and
generating third encoded data of a standard dynamic range (SDR) video as a second video in the standard brightness range, based on a master video; and
generating a play application that is executed by a playing apparatus to:
  control playing of the content based on preference information indicating a type of a preferred HDR video to be preferentially played and stored in a storage unit of the playing apparatus, wherein
    the preferred HDR video is one of the first HDR video or the second HDR video, and
    the storage unit has a plurality of regions for storing a plurality of units of information indicating a state of the playing apparatus;
  play encoded data of the preferred HDR video to be preferentially played, wherein the encoded data is one of the first encoded data or the second encoded data;
  play the third encoded data of the SDR video as the second video in the standard brightness range based on absence of the preferred HDR video;
  separate a video stream from one of the first encoded data, the second encoded data, or the third encoded data based on the preference information; and
  decode the video stream.

* * * * *